(12) United States Patent
Nashimoto et al.

(10) Patent No.: US 11,132,434 B2
(45) Date of Patent: Sep. 28, 2021

(54) SIGNAL PROCESSING DEVICE, SIGNAL PROCESSING METHOD AND COMPUTER READABLE MEDIUM

(71) Applicant: Mitsubishi Electric Corporation, Tokyo (JP)

(72) Inventors: Shoei Nashimoto, Tokyo (JP); Takeshi Sugawara, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 260 days.

(21) Appl. No.: 16/323,414

(22) PCT Filed: Sep. 26, 2016

(86) PCT No.: PCT/JP2016/078169
§ 371 (c)(1),
(2) Date: Feb. 5, 2019

(87) PCT Pub. No.: WO2018/055748
PCT Pub. Date: Mar. 29, 2018

(65) Prior Publication Data
US 2019/0236266 A1    Aug. 1, 2019

(51) Int. Cl.
*G06F 21/44* (2013.01)
*H04W 12/06* (2021.01)
(Continued)

(52) U.S. Cl.
CPC ............ *G06F 21/445* (2013.01); *G06F 21/31* (2013.01); *G06F 21/44* (2013.01); *G06F 21/83* (2013.01); *H04L 9/32* (2013.01); *H04W 12/06* (2013.01)

(58) Field of Classification Search
None
See application file for complete search history.

(56) References Cited

U.S. PATENT DOCUMENTS

2009/0207016 A1* 8/2009 Laackmann ......... G08B 29/046
340/540
2011/0184575 A1   7/2011 Kawamoto et al.
(Continued)

FOREIGN PATENT DOCUMENTS

DE    10038444 A1    2/2002
EP    1179671 A2     2/2002
(Continued)

OTHER PUBLICATIONS

Asai, "Study on Amplitude Control of Resonance Actuator," Osaka University Knowledge Archive, retrieved from URL:http://hdl.handle.net/11094/52157, Jan. 2015, pp. 1-104 (112 pages total) with a partial English translation.
(Continued)

*Primary Examiner* — Brandon S Hoffman
(74) *Attorney, Agent, or Firm* — Birch, Stewart, Kolasch & Birch, LLP

(57) ABSTRACT

A signal modulation unit modulates an actuator control signal for controlling an actuator by using a modulation signal. A correlation calculation unit calculates, when a measurement signal indicating a physical state measured by a passive sensor is received from the passive sensor after a modulated actuator control signal being the actuator control signal having been modulated by the signal modulation unit is transmitted to the actuator, a correlation between the measurement signal received and a modulation signal used for modulation of the actuator control signal by the signal modulation unit. The signal determination unit determines whether or not the measurement signal is a legitimate signal by using a correlation value obtained by the correlation calculation unit.

16 Claims, 15 Drawing Sheets

(51) Int. Cl.
  *G06F 21/31* (2013.01)
  *H04L 9/32* (2006.01)
  *G06F 21/83* (2013.01)

(56) References Cited

U.S. PATENT DOCUMENTS

| | | | | |
|---|---|---|---|---|
| 2014/0136583 | A1* | 5/2014 | Hyde | G06F 7/588 708/250 |
| 2014/0283047 | A1 | 9/2014 | Dixit et al. | |
| 2016/0049071 | A1* | 2/2016 | Beaver | G08B 29/185 340/514 |
| 2017/0024983 | A1* | 1/2017 | Reeves | G08B 13/02 |
| 2017/0069190 | A1* | 3/2017 | Hansen | G06K 9/00087 |
| 2017/0195789 | A1 | 7/2017 | Higure et al. | |

FOREIGN PATENT DOCUMENTS

| | | |
|---|---|---|
| JP | 11-211804 A | 8/1999 |
| JP | 2004-48096 A | 2/2004 |
| JP | 2011-154410 A | 8/2011 |
| JP | 2013-15884 A | 1/2013 |
| JP | 2014-179074 A | 9/2014 |
| JP | 2015-8558 A | 1/2015 |
| WO | WO 2016/051945 A1 | 4/2016 |

OTHER PUBLICATIONS

Imai et al., "Information Theory," Syokodou, Feb. 28, 1984, pp. 100-101, 238, (3 pages total), with partial English translation.
Kiyomoto et al., "A Description of the KCipher-2 Encryption Algorithm," Independent Submission; Request for Comments: 7008, Aug. 2013, pp. 1-37.
Matsubara et al., "A Guide to Statistics (Basic Statistics I)," Tokyo University Publications, Jul. 10, 1991, pp. 6-7, 216-217 (4 pages total), with partial English translation.
Oishi et al., "Sound Source Identification of Percussion Using Machine Learning," Waseda University, Feb. 1, 2015, pp. 1-74 (83 pages total) with partial English translation.
Shoukry et al., "PyCRA: Physical Challenge-Response Authentication for Active Sensors Under Spoofing Attacks," Proceedings of the 22nd ACM SIGSAC Conference on Computer and Communications Security, 2015, 12 pages.
Son et al., "Rocking Drones with Intentional Sound Noise on Gyroscopic Sensors," 24th USENIX Security Symposium, Aug. 12-14, 2015, pp. 881-896.
International Search Report (Form PCT/ISA/210) for International Application No. PCT/JP2016/078169, dated Nov. 8, 2016.
Oishi, "Sound Source Identification of Percussion Using Machine Learning," Waseda University, Feb. 1, 2016, pp. 1-74 (83 pages total) with partial English translation.

\* cited by examiner

SIGNAL PROCESSING DEVICE, SIGNAL PROCESSING METHOD AND COMPUTER READABLE MEDIUM

TECHNICAL FIELD

The present invention relates to a signal processing device, a signal processing method and a signal processing program.

BACKGROUND ART

By utilizing information collection by using sensors whereto a network function is added, and analysis of information collected by the sensors, an improvement is anticipated on operational efficiency of agriculture, industry and medical procedure.

The sensors to be used for such usage may be classified into passive sensors and active sensors.

The passive sensor is a sensor to sense change in the external world without having an effect on the external world by itself. The passive sensor is configured only by device to acquire information passively. For example, a temperature sensor, a pressure-sensitive sensor, and an optical sensor, etc. are passive sensors.

The active sensor is a sensor to act on the external world by itself, and to sense the result. The active sensor is configured by a passive sensor and a dedicated actuator. The passive sensor is a sensor to acquire information passively as mentioned above. The dedicated actuator acts on the external world or a controlled object actively to let the passive sensor acquire information from the external world or the controlled object. For example, distance measurement devices such as an infrared distance measurement sensor and an ultrasonic distance measurement sensor, etc. are active sensors. In the infrared distance measurement sensor, an infrared optical generator (infrared light emitting diode (LED), etc.) is the dedicated actuator, and an infrared optical receiver (infrared sensor) is the passive sensor. Further, in the ultrasonic distance measurement sensor, an ultrasonic generator (speaker) is the dedicated actuator, and an ultrasonic receiver (microphone) is the passive sensor.

In order for a system which controls an object based on information of sensors to operate normally, it is necessary that the information of sensors is reliable. Therefore, when using sensors, there is a need to confirm that data sensed is not malicious data by an attacker. In such an event of an attack on sensors, a method of deceiving sensors physically, not falsifying electronic data, may be used. For example, it may be considered an attack method to physically alter a state of a sensor or an attack method to physically falsify information read by the sensor. It is difficult to deal with such attacks by conventional digital countermeasures.

As attack methods of physically altering a state of a sensor, there is a method to provide an abnormal signal to badly affect the sensor. Anomaly detection to check deviation from a normal value is effective against such attacks, in both cases of an active sensor and a passive sensor. Non-Patent Literature 1 discloses an attack method to provide ultrasonic waves to a gyroscope sensor mounted on a drone, and to put the gyroscope sensor into an abnormal state, and its countermeasure thereof.

Meanwhile, as an attack to physically falsify information read by a sensor, there is an attack of making a signal opposite to a normal signal collide with the normal signal, or an attack of making a sensor sense a false signal. Such attacks are hereinafter called change cancellation attacks.

There is a problem in that it is impossible to cope with the change cancellation attacks only with anomaly detection since a read value (sensor output) of the sensor attacked falls within a normal value.

A countermeasure against change cancellation attacks has been proposed for an active sensor. Non-Patent Literature 2 discloses a method to detect attacks by adding additional information when an active sensor acts on the external world. Non-Patent Literature 2 discloses a countermeasure against attacks on a magnetic encoder. Specifically, in the countermeasure of Non-Patent Literature 2, control is added to a dedicated actuator configuring the magnetic encoder, i.e., a magnetic field generator, thereby acting on a controlled object intermittently. Next, it is confirmed whether information acquired by a passive sensor configuring the magnetic encoder includes intermittent values or not. When the magnetic encoder is not attacked, the output value of the passive sensor is a value close to 0 in a time period when the magnetic field generator is switched off. Meanwhile, when the magnetic encoder is attacked, since the attacker provides some information to the magnetic sensor, information reaches the passive sensor even in the time period when the magnetic field generator is switched off, and some value is output as an output value of the passive sensor. As described, by the method of Non-Patent Literature 2, it is possible to determine presence or absence of an attack depending on whether there is an output from the passive sensor in the time period when the magnetic field generator is switched off.

CITATION LIST

Patent Literature

Non-Patent Literature 1: Son, Yunmok, et al. "Rocking drones with intentional sound noise on gyroscopic sensors." 24th USENIX Security Symposium (USENIX Security 15). 2015.

Non-Patent Literature 2: Shoukry, Yasser, et al. "PyCRA: Physical Challenge-Response Authentication For Active Sensors Under Spoofing Attacks." Proceedings of the 22nd ACM SIGSAC Conference on Computer and Communications Security. ACM, 2015.

SUMMARY OF INVENTION

Technical Problem

As typified by temperature sensors, pressure sensors and monitoring cameras, etc., most of sensors used in the world are passive sensors. Meanwhile, regarding change cancellation attacks, countermeasures are proposed only for active sensors, and there is no effective countermeasure for passive sensors. Existing countermeasure methods cannot be applied to passive sensors without a modification since the existing countermeasure methods are based on the ability to act on the external world. Further, the cost is increased by adding a device (for example, a dedicated actuator, etc.) to act on a controlled object.

As described, currently, there is no effective method to detect change cancellation attacks against passive sensors. That is, there is a problem that it is impossible to determine whether a signal received from a passive sensor is a legitimate signal or an illegitimate signal.

The present invention is mainly aimed at resolving such problems. That is, the present invention is mainly aimed at making it possible to determine whether a signal received from a passive sensor is a legitimate signal or not.

Solution to Problem

A signal processing device according to the present invention, which is connected to an actuator, and a passive sensor to measure a physical state when the actuator operates, the signal processing device includes:

a signal modulation unit to modulate an actuator control signal for controlling the actuator by using a modulation signal;

a correlation calculation unit to calculate, when a measurement signal indicating the physical state measured by the passive sensor is received from the passive sensor after a modulated actuator control signal being the actuator control signal having been modulated by the signal modulation unit is transmitted to the actuator, a correlation between the measurement signal received and the modulation signal used for modulation of the actuator control signal by the signal modulation unit; and a signal determination unit to determine whether or not the measurement signal is a legitimate signal by using a correlation value obtained by the correlation calculation unit.

Advantageous Effects of Invention

In the present invention, when an actuator operates based on a modulated actuator control signal, measurement signal has a high correlation with modulation signal since a component of the modulation signal is included in the measurement signal. Therefore, according to the present invention, by using a correlation value between the measurement signal and the modulation signal, it is possible to determine whether the measurement signal from passive sensor is a legitimate signal or not.

DESCRIPTION OF EMBODIMENTS

Figure 1:
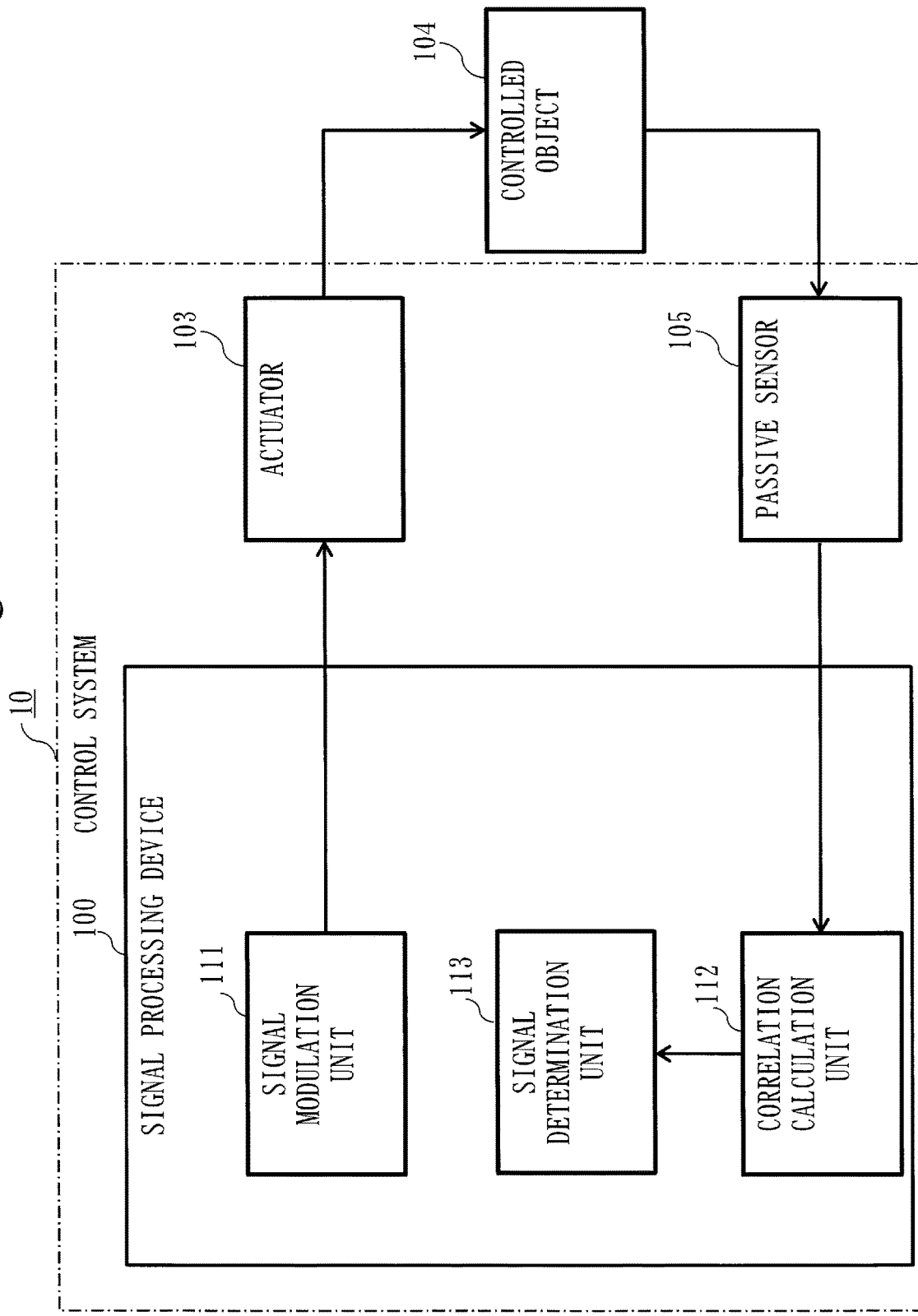
FIG. 1 is a diagram illustrating a configuration example of a control system according to a first embodiment.

Hereinbelow, embodiments of the present invention will be described with use of the drawings. In following description and the drawings on the embodiments, elements provided with identical reference characters represent identical elements or corresponding elements.

First Embodiment

\*\*\*Outline\*\*\*

Generally, in a system wherein a sensor is used, an actuator to change a state of a controlled target exists. The actuator changes the state of the controlled target based on a sensor read value being a value read by the sensor.

Therefore, a passive sensor is often used with an actuator. Please note that the actuator mentioned here is different from a dedicated actuator used for an active sensor. That is, the actuator mentioned here is not a dedicated actuator to make a passive sensor acquire information from the external world or a controlled object in an active sensor, but is an actuator to change a physical state of a controlled object for control of the controlled object. For example, in a case wherein the controlled object is a pipeline, the passive sensor is a pressure gauge or a flowmeter attached to an outdoor pipe, and the actuator is a valve or a pump. Further, when the controlled object is an air conditioning system, the passive sensor is a temperature sensor, and the actuator is an air conditioner or a heater. Furthermore, when the controlled object is a drone, the passive sensor is a gyroscope sensor to detect an inclination or an acceleration rate, and the actuator is a motor.

Based on the above, in the present embodiment, explanation is provided of a configuration wherein detection of a change cancellation attack can be performed simultaneously while controlling a controlled object in a control system wherein a passive sensor is used.

In the control system according to the present embodiment, attack detection is performed by the following procedures.

First, the control system adds information for authentication to an actuator control signal to control an actuator. Specifically, a modulation signal is information for authentication. Then, the control system adds the modulation signal to the actuator control signal by modulating the actuator control signal by using the modulation signal. The actuator operates based on the actuator control signal whereto the information for authentication is added, i.e., the actuator control signal (hereinafter referred to as a modulated actuator control signal) after being modulated by using the modulation signal.

The passive sensor measures a physical state at the time when the actuator operates. The physical state measured by the passive sensor is a physical state of a controlled object or a physical state of the environment where the controlled object and the passive sensor exist.

Then, the control system calculates a correlation between a measurement signal indicating the physical state measured by the passive sensor and a modulation signal used for modulation of the actuator control signal.

Next, the control system determines whether the measurement signal is a legitimate signal or an illegitimate signal by using a correlation value between the measurement signal and the modulation signal.

When the passive sensor senses the physical state of the controlled object, the correlation between the measurement signal and the modulation signal is high since the measurement signal from the passive sensor includes a component of the modulation signal. Meanwhile, when the passive sensor does not sense the physical state of the controlled object, that is, the passive sensor senses an improper physical state from an attacker, the correlation between the measurement signal and the modulation signal is low since the measurement signal from the passive sensor does not include the component of the modulation signal.

Therefore, when the correlation value between the measurement signal and the modulation signal is equal to or more than a threshold value, the measurement signal is determined to be the legitimate signal. That is, the control system determines that a change cancellation attack does not occur.

Meanwhile, when the correlation value between the measurement signal and the modulation signal is less than a threshold value, the measurement signal is determined to be the illegitimate signal. That is, the control system determines that a change cancellation attack has occurred.

*Explanation of Configuration*

FIG. 1 illustrates an example of a function configuration of a control system 10 according to the present embodiment.

The control system 10 is configured by a signal processing device 100, an actuator 103 and a passive sensor 105.

The actuator 103 operates on the controlled object 104, and changes the physical state of the controlled object 104.

The passive sensor 105 measures the physical state of the controlled object 104 or an environment where the controlled object 104 or the passive sensor 105 exists, at the time when the actuator 103 operates.

The signal processing device 100 is connected to the actuator 103 and the passive sensor 105.

The signal processing device 100 is a computer system. The signal processing device 100 may be configured by one computer, or may be configured by a plurality of computers.

The signal processing device 100 includes a signal modulation unit 111, a correlation calculation unit 112 and a signal determination unit 113, as function components.

The signal modulation unit 111, the correlation calculation unit 112 and the signal determination unit 113 will be described below in detail.

Figure 2:
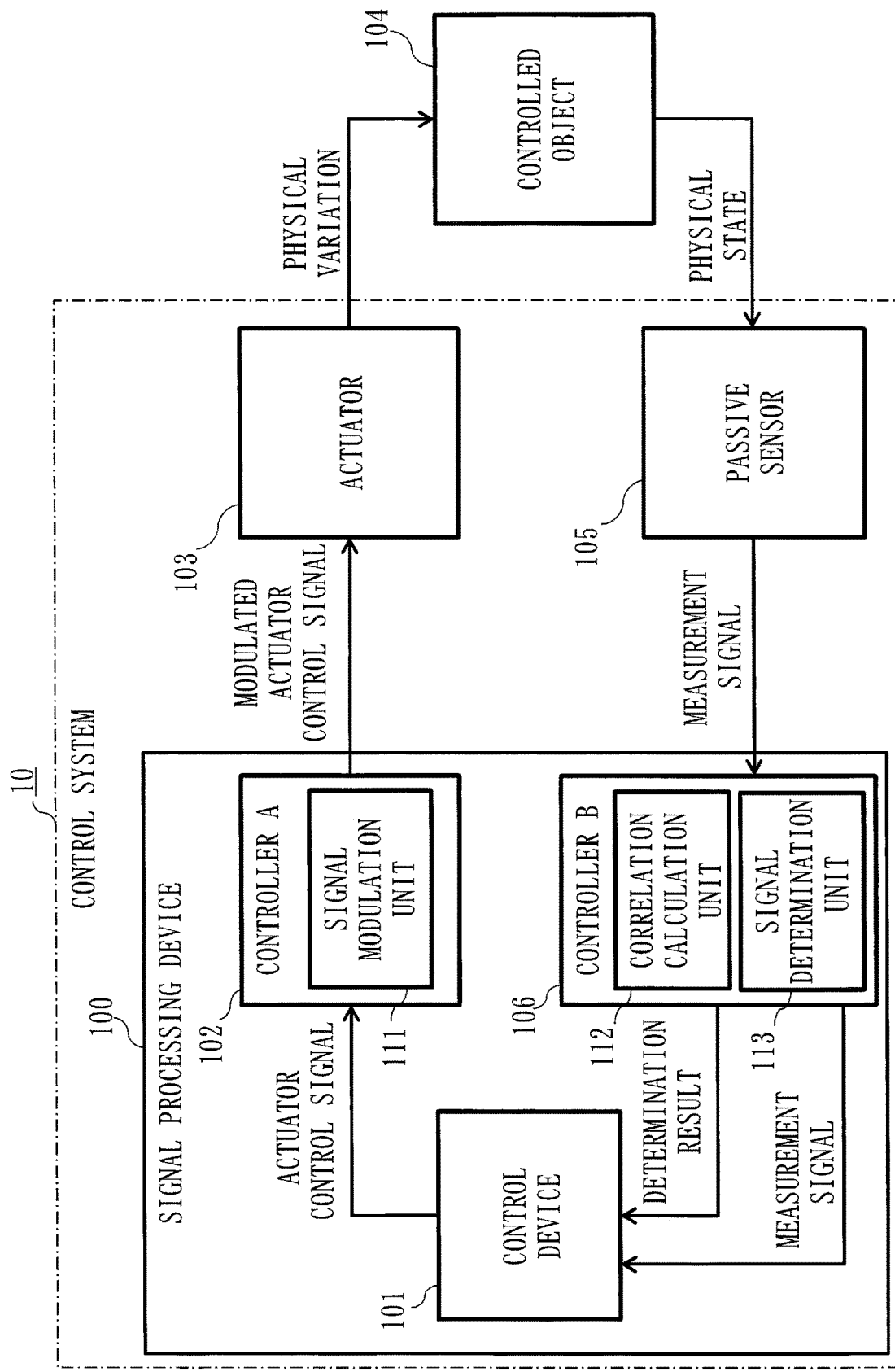
FIG. 2 is a diagram illustrating a configuration example of the control system according to the first embodiment.

FIG. 2 illustrates a detailed configuration of the signal processing device 100.

The signal processing device 100 is configured by a control device 101, a controller A102 and a controller B106.

The control device 101, the controller A102 and the actuator 103 are respectively different computers. That is, FIG. 2 illustrates an example wherein the signal processing device 100 is configured by a plurality of computers.

The control device 101 generates an actuator control signal, and transmits the actuator control signal to the controller A102. The actuator control signal is a signal to control the actuator 103 as described above.

Further, the control device 101 receives a determination result and a measurement signal from the controller B106. The determination result indicates a result of determination on whether or not the measurement signal is a legitimate signal. The measurement signal is a signal indicating the physical state measured by the passive sensor 105.

The control device 101 generates the actuator control signal based on the measurement signal received.

The controller A102 controls the actuator 103. The controller A102 corresponds to a first controller.

The controller A102 includes the signal modulation unit 111.

The controller A102 receives the actuator control signal from the control device 101, modulates the actuator control signal with a modulation signal, and transmits a modulated actuator control signal being the actuator control signal after modulation to the actuator 103.

The controller B106 controls the passive sensor 105. The controller B106 corresponds to a second controller.

The controller B106 includes a correlation calculation unit 112 and a signal determination unit 113.

The controller B106 receives the measurement signal from the passive sensor 105. Further, the controller B106 calculates a correlation between the measurement signal and the modulation signal. Furthermore, the controller B106 determines whether or not the measurement signal is a legitimate signal by using a correlation value between the measurement signal and the modulation signal.

Then, the controller B106 transmits the determination result and the measurement signal to the control device 101.

The control system 10 according to the present embodiment is configured to detect the change cancellation attack while performing feedback control, as illustrated in FIG. 2. The feedback control can be realized in an arbitrary method.

Figure 3:
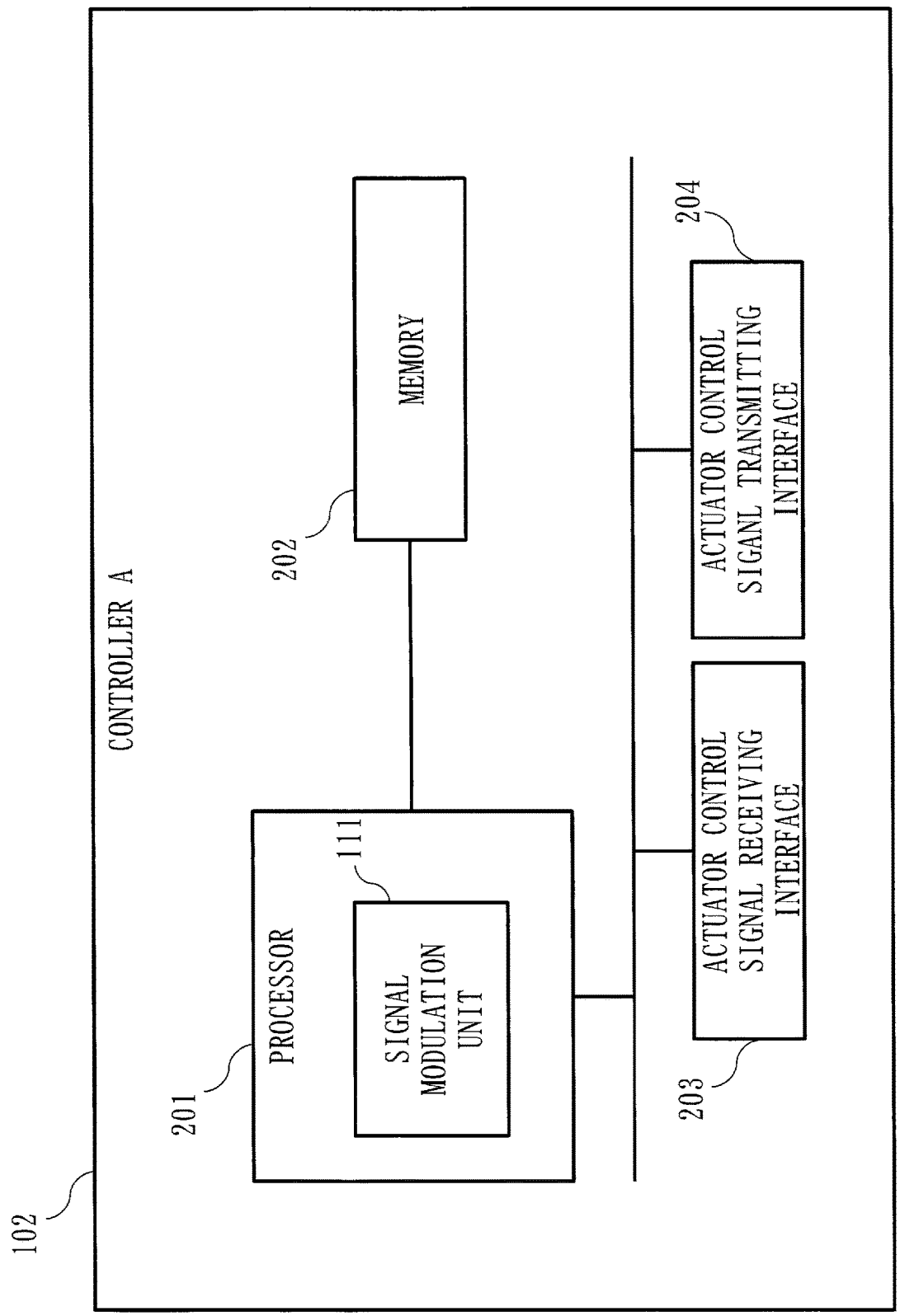
FIG. 3 is a diagram illustrating a configuration example of a controller A according to the first embodiment.

FIG. 3 illustrates a configuration example of the controller A102 according to the present embodiment.

The controller A102 includes a processor 201, a memory 202, an actuator control signal receiving interface 203 and an actuator control signal transmitting interface 204, as hardware.

The actuator control signal receiving interface 203 is an interface circuit connected to a communication line with the control device 103. The actuator control signal transmitting interface 204 is an interface circuit connected to a communication line with the actuator 103.

The actuator control signal receiving interface 203 receives the actuator control signal from the control device 101. The actuator control signal transmitting interface 204 transmits the modulated actuator control signal to the actuator 103. The actuator control signal transmitting interface 204 is a digital analog converter (DAC).

Further, the controller A102 includes the signal modulation unit 111 as a function component.

The function of the signal modulation unit 111 is realized as a program. The memory 202 stores the program to realize the function of the signal modulation unit 111. Then, the processor 201 executes the program to realize the function of the signal modulation unit 111. FIG. 3 schematically illustrates a state wherein the processor 201 executes the signal modulation unit 111.

Figure 4:
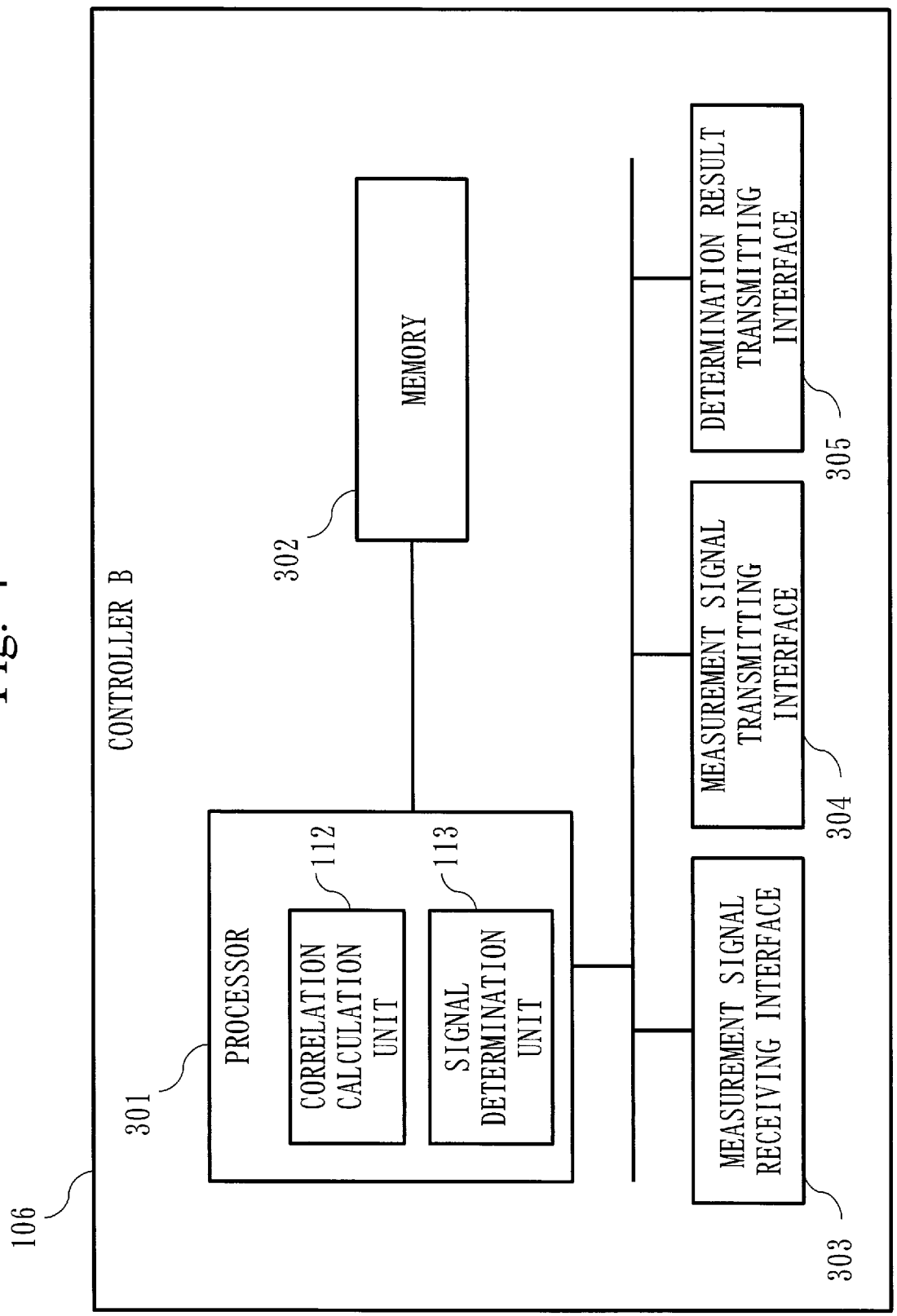
FIG. 4 is a diagram illustrating a configuration example of a controller B according to the first embodiment.

FIG. 4 illustrates a configuration example of the controller B106 according to the present embodiment.

The controller B106 includes a processor 301, a memory 302, a measurement signal receiving interface 303, a measurement signal transmitting interface 304 and a determination result transmitting interface 305, as hardware.

The measurement signal receiving interface 303 is an interface circuit connected to a communication line with the passive sensor 105.

The measurement signal transmitting interface 304 and the determination result transmitting interface 305 are interface circuits connected to a communication line with the control device 101.

The measurement signal receiving interface 303 receives a measurement signal from the passive sensor 105.

The measurement signal transmitting interface 304 transmits the measurement signal to the control device 101.

The determination result transmitting interface 305 transmits a determination result to the control device 101.

The measurement signal receiving interface 303 is an analog digital converter (ADC). Further, the controller B106 includes the correlation calculation unit 112 and the signal determination unit 113 as function components.

The functions of the correlation calculation unit 112 and the signal determination unit 113 are realized as a program. The memory 302 stores the program to realize the functions of the correlation calculation unit 112 and the signal determination unit 113. Then, the processor 301 executes the program to realize the functions of the correlation calculation unit 112 and the signal determination unit 113. In FIG. 4, it is schematically illustrated a state wherein the processor 301 executes the correlation calculation unit 112 and the signal determination unit 113.

The programs to realize the functions of the signal modulation unit 111, the correlation calculation unit 112 and the signal determination unit 113 correspond to a signal processing program.

Next, the signal modulation unit 111, the correlation calculation unit 112 and the signal determination unit 113 will be described in detail.

The signal modulation unit 111 modulates an actuator control signal with a modulation signal.

The modulation signal is stored in the memory 202 of the controller A102, and the signal modulation unit 111 reads the modulation signal from the memory 202, and modulates the actuator control signal with the modulation signal.

Figure 11:
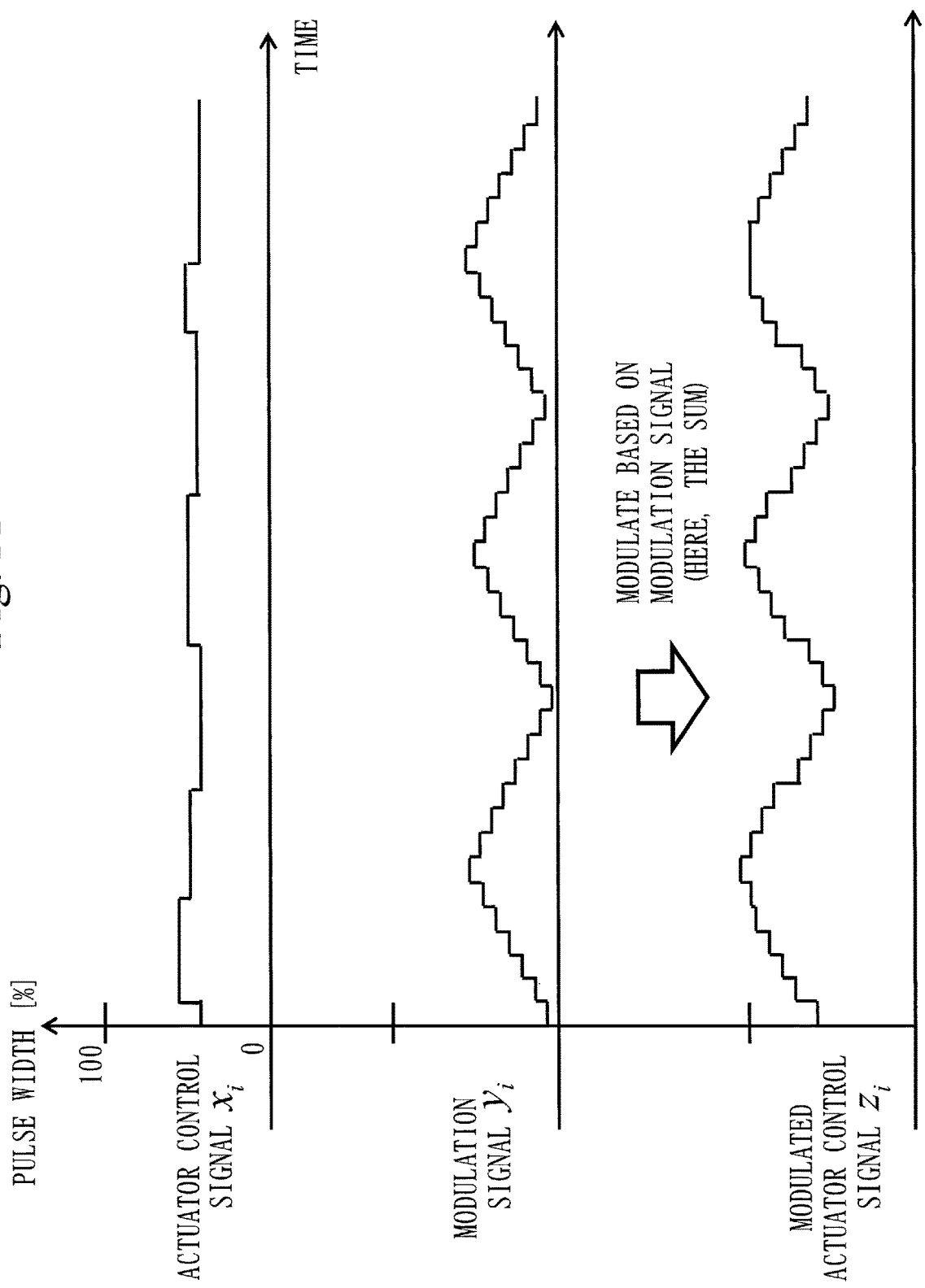
FIG. 11 is a diagram illustrating examples of an actuator control signal, a modulation signal and a modulated actuator control signal according to the first embodiment.

FIG. 11 illustrates examples of an actuator control signal, a modulation signal and a modulated actuator control signal. The modulation signal is time-series data as illustrated in FIG. 11.

In the example of FIG. 11, the signal modulation unit 111 modulates the actuator control signal by adding the actuator control signal and the modulation signal. The modulation signal is also called a sequence.

FIG. 11 will be described below in detail.

The operation performed by the signal modulation unit 111 corresponds to a signal modulation process.

The correlation calculation unit 112 calculates a correlation between a measurement signal received from the passive sensor 105 after the modulated actuator control signal is transmitted to the actuator 103, and a modulation signal used for modulation of the actuator control signal by the signal modulation unit 111.

The modulation signal is stored in the memory 302 of the controller B106. That is, the actuator 103 and the controller B106 share the modulation signal. The correlation calculation unit 112 reads the modulation signal from the memory 302, and calculates a correlation between the measurement signal and the modulation signal.

The operation performed by the correlation calculation unit 112 corresponds to a correlation calculation process.

The signal determination unit 113 determines whether the measurement signal is a legitimate signal or not by using the correlation value obtained by the correlation calculation unit 112.

More specifically, the signal determination unit 113 determines that the measurement signal is a legitimate signal when the correlation value is equal to or more than a threshold value. Meanwhile, when the correlation value is less than the threshold value, the measurement signal is determined to be an illegitimate signal caused by a change cancellation attack.

Further, the signal determination unit 113 transmits the measurement signal to the control device 101 via the measurement signal transmitting interface 304. Furthermore, the signal determination unit 113 transmits the determination result to the control device 101 via the determination result transmitting interface 305.

Further, the signal determination unit 113 may output a warning to the control device 101 when the signal determination unit 113 determines the measurement signal as the illegitimate signal.

The operation performed by the signal determination unit 113 corresponds to a signal determination process.

*Explanation of Operation*

In the control system 10 according to the present embodiment, it is possible to perform attack detection by adding a modulation process to the operation performed in a conventional feedback system. That is, in the control system 10 according to the present embodiment, it is possible to realize attack detection without adding a dedicated actuator, etc.

First, the operation of the conventional feedback system will be described using FIG. 2. Then, the operation of the control system 10 according to the present embodiment will be described in a manner of describing difference from the conventional feedback system.

The conventional feedback system operates in the following manner.

The control device 101 determines an actuator control signal so as to approximate the controlled object 104 to a control target value by using a value (feedback value) indicated in a measurement signal from the passive sensor 105, and the control target value of the controlled object 104 (feedback control).

The controller A102 includes an actuator control signal receiving interface 203. The actuator control signal receiving interface 203 converts an actuator control signal being a digital signal arriving from the control device 101 into an analog signal, and transmits the actuator control signal converted into the analog signal to the actuator 103. The digital-analog conversion process of the actuator control signal by the actuator control signal receiving interface 203 is referred to as a DAC process.

Meanwhile, the controller B106 includes a measurement signal receiving interface 303. The measurement signal receiving interface 303 converts the measurement signal being an analog signal arriving from the passive sensor 105 into a digital signal, and transmits to the control device 101 the measurement signal digitally-converted. The analog-to-digital conversion process of the measurement signal by the measurement signal receiving interface 303 is referred to as an ADC process.

Further, the measurement signal being an analog signal is also called sensing information, and the measurement signal being a digital signal is also called a sensor read value.

Such feedback control is described in the following Reference 1.

Reference 1: Yasuyoshi Asai, "Study on Amplitude Control of Resonance Actuator" (2012).

Next, an example of the operation of the control system 10 according to the present embodiment will be described.

The control system 10 according to the present embodiment shares a modulation signal (sequence) with the controller A102 and the controller B106 by using a certain method. Then, the controller A102 performs a process to embed authentication information based on the modulation signal (sequence) shared in addition to the DAC process. That is, the signal modulation unit 111 modulates an actuator control signal being a digital signal arriving from the control device 101 using the modulation signal shared. As described above, the actuator control signal after modulation is referred to as a modulated actuator control signal. Then, the actuator control signal transmitting interface 204 converts the modulated actuator control signal into an analog signal, and transmits to the actuator 103 the modulated actuator control signal converted into the analog signal. Modulation described here means converting information/signals of a certain sequence in accordance with a predetermined rule and obtaining information/signals of a new sequence. The modulation method of the actuator control signal will be described below in detail.

Further, the control B106 performs an attack detection process in addition to the ADC process.

More specifically, the measurement signal receiving interface 303 receives a measurement signal (sensing information) being an analog signal from the passive sensor 105, and converts the measurement signal (sensing information) received into a digital signal. Then, the correlation calculation unit 112 calculates a correlation between the measurement signal (sensor read value) converted into the digital signal by the measurement signal receiving interface 303 and the modulation signal (sequence) shared with the controller A102. Then, the signal determination unit 113 determines whether or not a change cancellation attack exists by comparing the correlation value with a threshold value set beforehand. After that, the measurement signal transmitting interface 304 transmits the measurement signal (sensor read value) to the control device 101, and the determination result transmitting interface 305 transmits the determination result to the control device 101. The correlation mentioned here is a degree of relationship between certain information/signals and other information/signals. A calculation method of correlation will be described below in detail.

The modulation signal embedded in the actuator control signal by the signal modulation unit 111 in the controller A102 is transmitted to the controlled object 104 as a physical variation, and changes a physical state of the controlled object 104. At this time, the physical state of the controlled object 104 is changed redundantly for the amount of information of the modulation signal in addition to change by normal feedback control. Therefore, it is preferable to select a modulation scheme that does not give an adverse effect on the controlled object 104.

After that, the passive sensor 105 measures the physical state of the controlled object 104, and transmits the measurement signal indicating the measurement result to the controller B. The measurement signal includes components of the modulation signal (sequence). Conversely, when the measurement signal does not include the components of the modulation signal, this proves that an attack has been made against the controlled object 104 or an environment where the controlled object 104 exists. Therefore, by calculating the correlation between the measurement signal and the original modulation signal, it is found out whether the components corresponding to the modulation signal are included in the measurement signal. Therefore, the signal processing device 100 according to the present embodiment can detect a change cancellation attack.

As described above, in the signal processing device 100 according to the present embodiment, it is possible to perform attack detection concurrently with control by utilizing a feature that the modulation signal acted on the actuator 103 by the controller A102 via the actuator control signal arrives at the passive sensor 105 via the controlled object 104.

Figure 5:
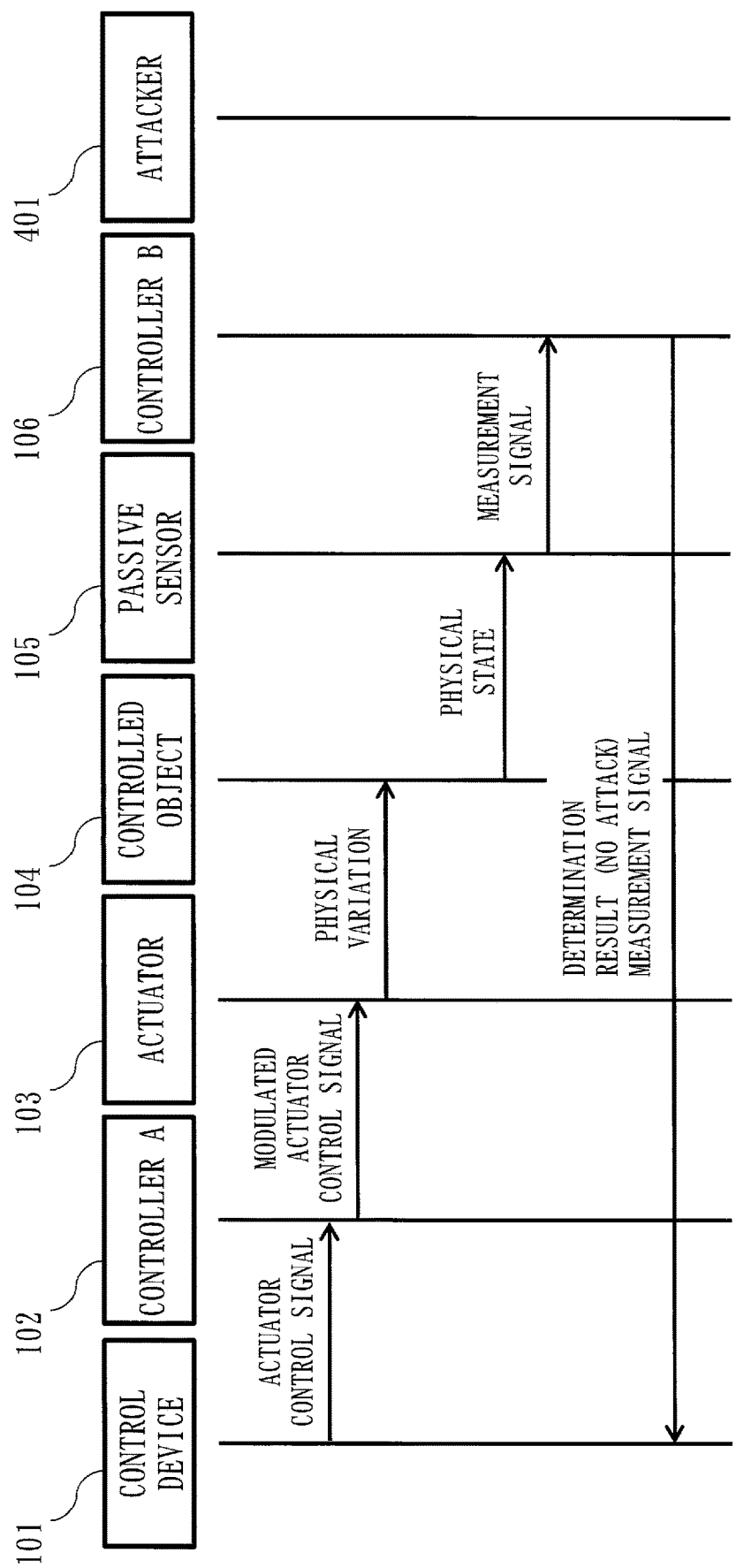
FIG. 5 is a sequence diagram illustrating an example of an operation of the control system when no attack is made according to the first embodiment.
Figure 6:
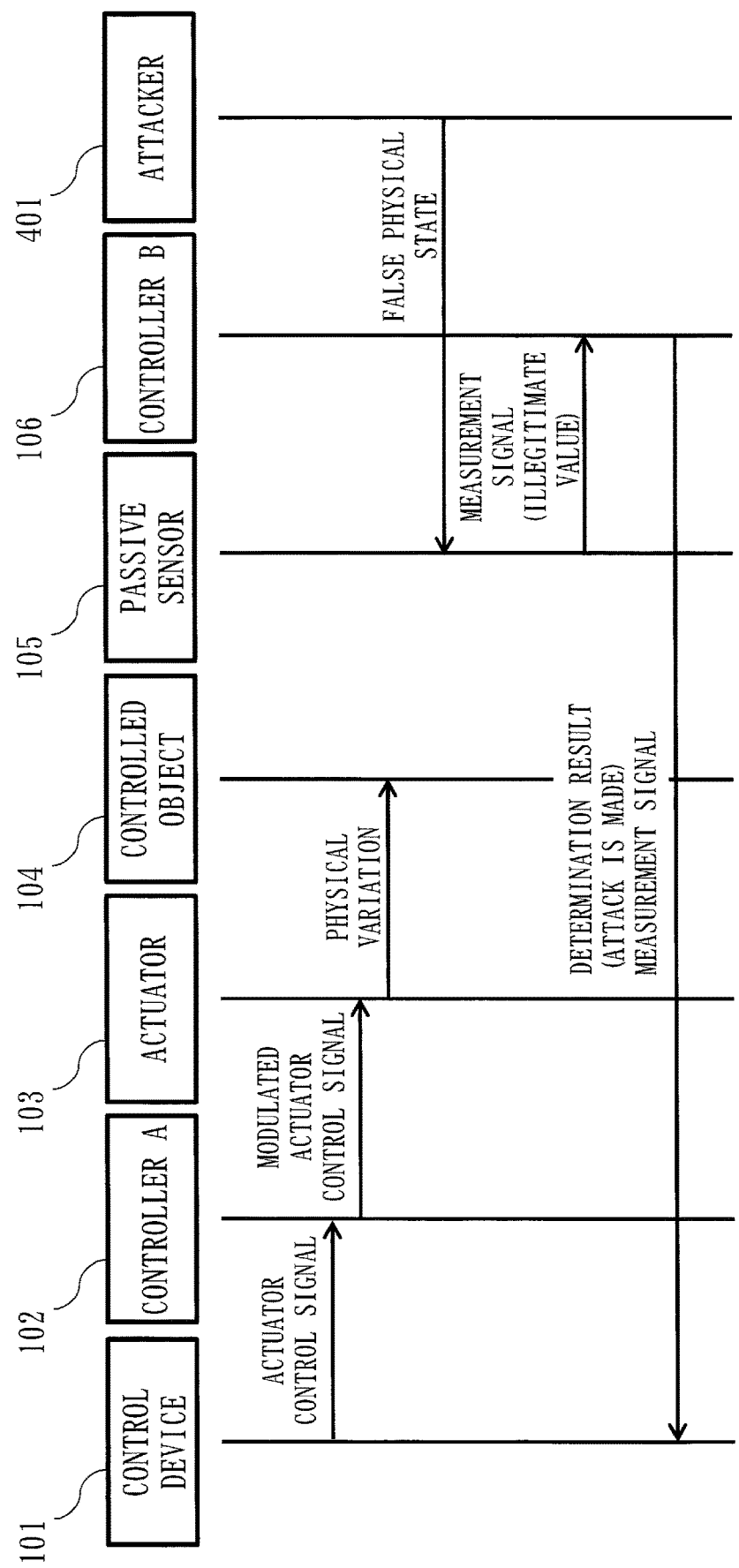
FIG. 6 is a sequence diagram illustrating an example of an operation of the control system when an attack is made according to the first embodiment.

FIG. 5 and FIG. 6 are sequence diagrams illustrating examples of the operation of the control system 10 according to the present embodiment.

FIG. 5 illustrates an example of the operation of the control system 10 when no attack is made. FIG. 6 illustrates an example of the operation of the control system 10 when an attack is made.

FIG. 5 and FIG. 6 illustrate examples of the operations of the control device 101, the controller A102, the actuator 103, the controlled object 104, the passive sensor 105, the controller B106 and an attacker 401.

First, common parts in FIG. 5 and FIG. 6 are described.

First, a modulation signal is shared between the controller A102 and the controller B106 by a certain method.

Then, the control device 101 transmits an actuator control signal to the controller A102.

In the controller A102, the signal modulation unit 111 modulates the actuator control signal received based on the modulation signal shared with the controller B106.

The modulated actuator control signal is transmitted to the actuator 103 from the controller A102.

The actuator 103 adds a physical variation to the controlled object 104 based on the modulated actuator control signal received.

As illustrated in FIG. 5, when a change cancellation attack is not made, the passive sensor 105 senses the physical state of the controlled object 104 properly. Therefore, a proper measurement signal indicating a proper value is transmitted to the controller B106 from the passive sensor 105.

In the controller B106, the measurement signal receiving interface 303 converts the analog measurement signal into a digital signal.

Further, in the controller B106, the correlation calculation unit 112 calculates a correlation between the modulation signal shared with the controller A102, and the measurement signal. In the example of FIG. 5, the passive sensor 105 senses the physical state of the controlled object 104 being influenced by the actuator control signal whereon the modulation signal is reflected. Therefore, the correlation between the modulation signal and the measurement signal is high, and the correlation value obtained by calculation becomes higher than a threshold value. In this manner, the signal determination unit 113 of the controller B106 determines that a change cancellation attack has not occurred. Then, the determination result transmitting interface 305 transmits the determination result that the change cancellation attack has not occurred, to the control device 101. Further, the measurement signal transmitting interface 304 transmits the measurement signal to the control device 101.

Furthermore, as illustrated in FIG. 6, when a change cancellation attack is made, the passive sensor 105 senses a false physical state given by the attacker 401. Therefore, an illegitimate measurement signal indicating an illegitimate measurement result is transmitted to the controller B106 from the passive sensor 105.

In the controller B106, the measurement signal receiving interface 303 converts the analog measurement signal into a digital signal.

Furthermore, in the controller B106, the correlation calculation unit 112 calculates a correlation between the modulation signal shared with the controller A102 and the measurement signal. In the example of FIG. 6, the measurement signal of the passive sensor 105 corresponds to the false physical state given by the attacker 401, and does not include the components of the modulation signal. Therefore, the correlation between the modulation signal and the measurement signal is low, and the correlation value obtained by calculation becomes lower than a threshold value. In this manner, the signal determination unit 113 of the controller B106 determines that a change cancellation attack occurs. Then, the determination result transmitting interface 305 transmits to the control device 101 a determination result that the change cancellation attack occurs. Further, the measurement signal transmitting interface 304 transmits the measurement signal to the control device 101.

Figure 7:
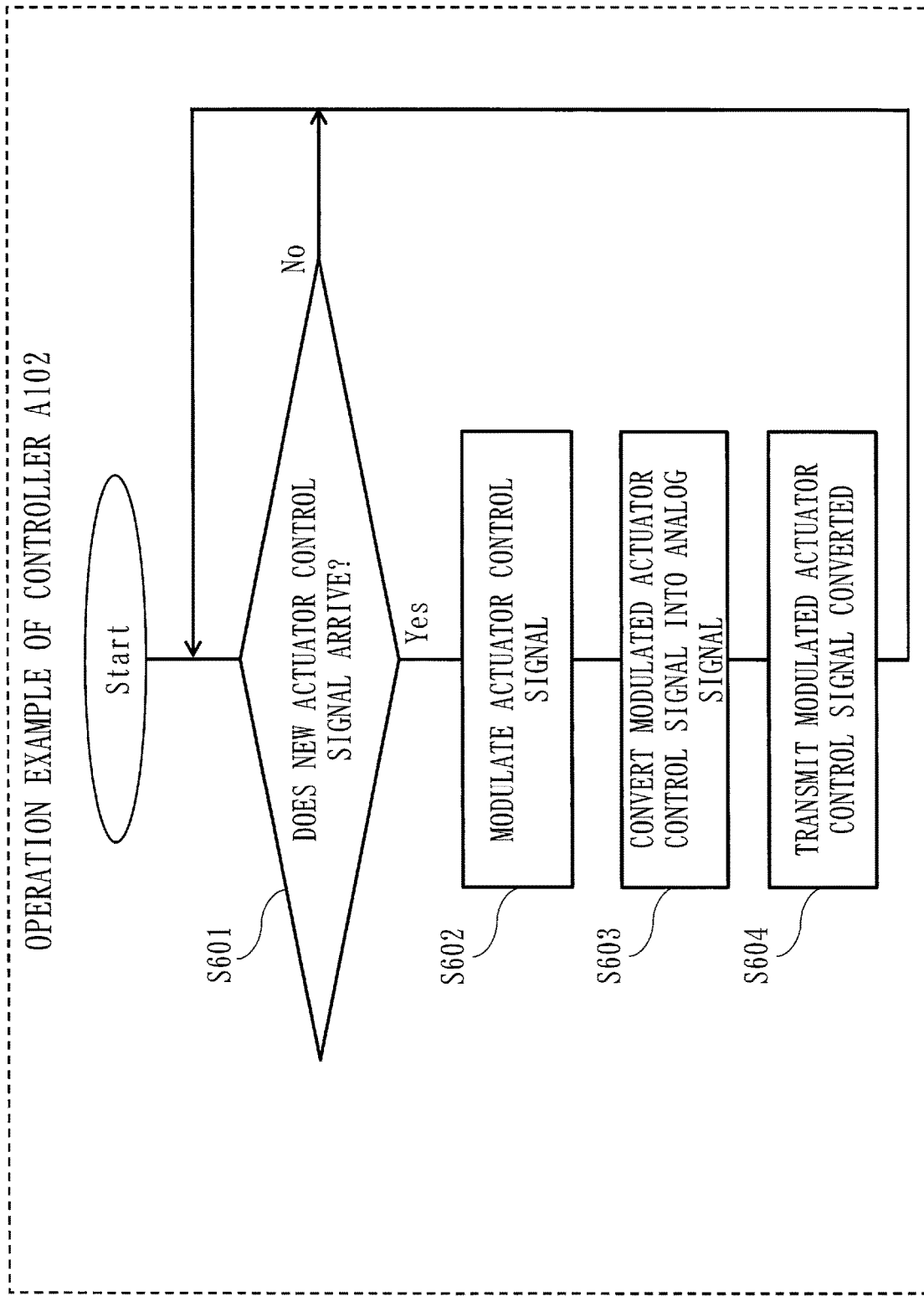
FIG. 7 is a flowchart illustrating an example of an operation of the controller A according to the first embodiment.

Next, an example of the operation of the controller A102 will be described using a flowchart of FIG. 7.

Hereinafter, an actuator control signal $x_i$ represents an actuator control signal at a time point i. Further, a modulation signal $y_i$ represents a modulation signal at the time point i.

The modulation performed by the signal modulation unit 111 is a process to create an output $z_i$ wherein the actuator control signal $x_i$ is combined with the modulation signal $y_i$ in a certain manner. The output $z_i$ corresponds to a modulated actuator control signal.

First, in a step S601, the signal modulation unit 111 confirms whether or not a new actuator control signal has arrived via the actuator control signal receiving interface 203.

When a new actuator control signal has not arrived, the signal modulation unit 111 repeatedly confirms whether or not a new actuator control signal has arrived until a new actuator control signal arrives.

Meanwhile, when a new actuator control signal $x_i$ arrives, the signal modulation unit 111 performs modulation of the actuator control signal based on the modulation signal $y_i$ shared with the controller B106 (step S602).

Further, in a step S603, the actuator control signal transmitting interface 204 converts the modulated actuator control signal $z_i$ obtained by modulation into an analog signal.

Then, in a step S604, the actuator control signal transmitting interface 204 transmits the modulated actuator control signal converted into an analog signal to the actuator 103.

By the manner as described above, it is possible to modulate actuator control signals sequentially, and transmit the actuator control signals to the actuator 103.

Figure 8:
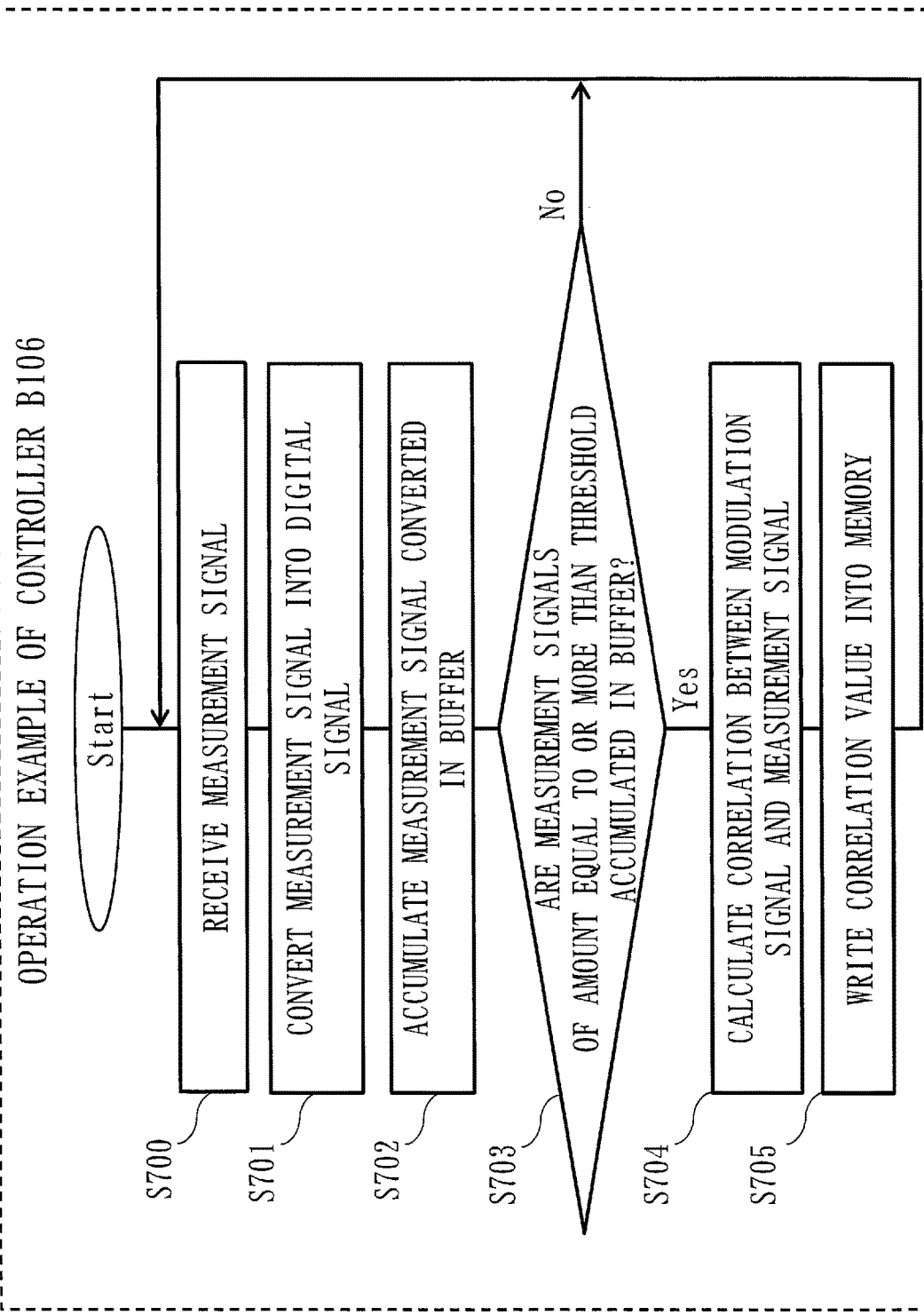
FIG. 8 is a flowchart illustrating an example of an operation of the controller B according to the first embodiment.

Next, an example of the operation of the controller B106 will be described using a flowchart of FIG. 8.

First, in a step S700, the measurement signal receiving interface 303 receives a measurement signal (sensing information).

Next, in a step S701, the measurement signal receiving interface 303 converts the measurement signal (sensing information) received into a digital signal.

Then, in a step S702, the measurement signal receiving interface 303 stores the measurement signal (sensor read value) after digital conversion in a buffer area (hereinafter simply called a buffer) in the memory 302.

Next, in a step S703, the correlation calculation unit 112 monitors the amount of measurement signals inside the buffer. Then, when the measurement signals of an amount equal to or more than a threshold value are not accumulated in the buffer, the procedure returns to a step S700 again, and the measurement signal receiving interface 303 converts measurement signals received into digital signals and stores the measurement signals after digital conversion in the buffer, every time a measurement signal is received.

Meanwhile, when the measurement signals of an amount equal to or more than the threshold value are accumulated in the buffer, the correlation calculation unit 112 calculates a correlation in a step S704. That is, the correlation calculation unit 112 calculates a correlation between the modulation signals shared with the controller A102 and the measurement signals in the buffer.

Then, in a step S705, the correlation calculation unit 112 writes a correlation value obtained by calculation in the memory 302.

By the manner as described above, it is possible for the controller B106 to calculate a correlation between modulation signals and measurement signals.

Figure 9:
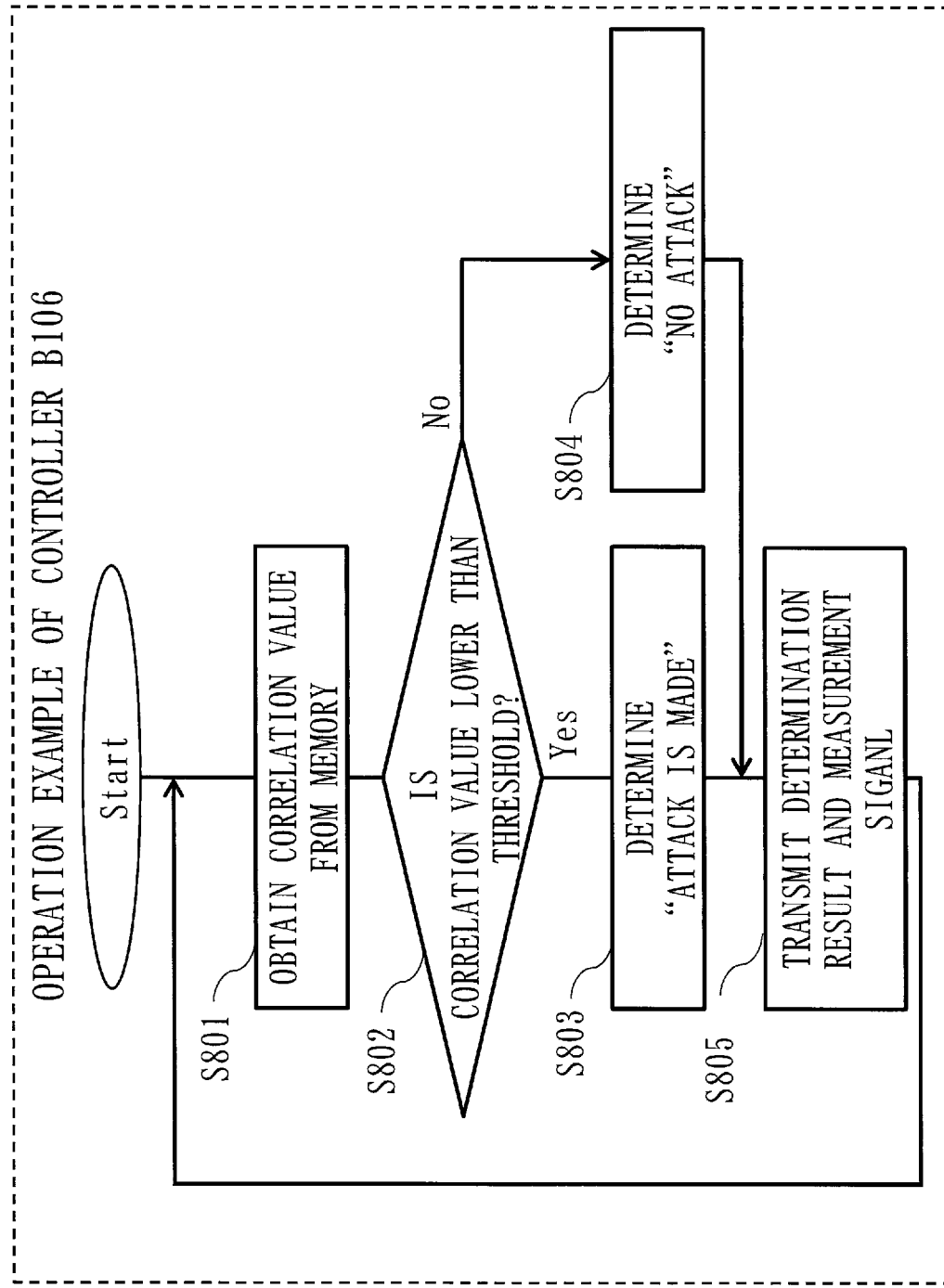
FIG. 9 is a flowchart illustrating an example of an operation of the controller B according to the first embodiment.

Next, an example of the operation of the controller B106 will be described using a flowchart of FIG. 9.

First, in a step S801, the signal determination unit 113 obtains from the memory 302 the correlation value written in the memory 302 by the correlation calculation unit 112.

Next, in a step S802, the signal determination unit 113 calculates whether or not the correlation value obtained from the memory 302 is lower than a threshold value. Then, when the correlation value is lower than the threshold value, the signal determination unit 113 determines that a change cancellation attack occurs ("attack is made") in a step S803.

Meanwhile, when the correlation value is equal to or more than the threshold value, the signal determination unit 113 determines that a change cancellation attack does not occur ("no attack") in a step S804.

Next, the signal determination unit 113 transmits the determination result on presence or absence of an attack and measurement signals to the control device 101, in a step S805. When "attack is made" is determined in the step S803, the signal determination unit 113 transmits to the control device 101 a determination result to notify that a change cancellation attack occurs. Meanwhile, when "no attack" is determined in the step S804, the signal determination unit 113 transmits to the control device 101 a determination result to notify that a change cancellation attack does not occur.

Further, when "attack is made" is determined in a step S803, the signal determination unit 113 may transmit a prescribed warning to the control device 110.

By the manner as described above, it is possible for the controller B106 to determine whether or not a change cancellation attack is made based on correlation values, and to notify the control device 101 whether a change cancellation attack is made.

Concrete Example 1

Next, the control system 10 according to the present embodiment will be described by giving a concrete example.

\*\*\*Explanation of Configuration\*\*\*

Figure 10:
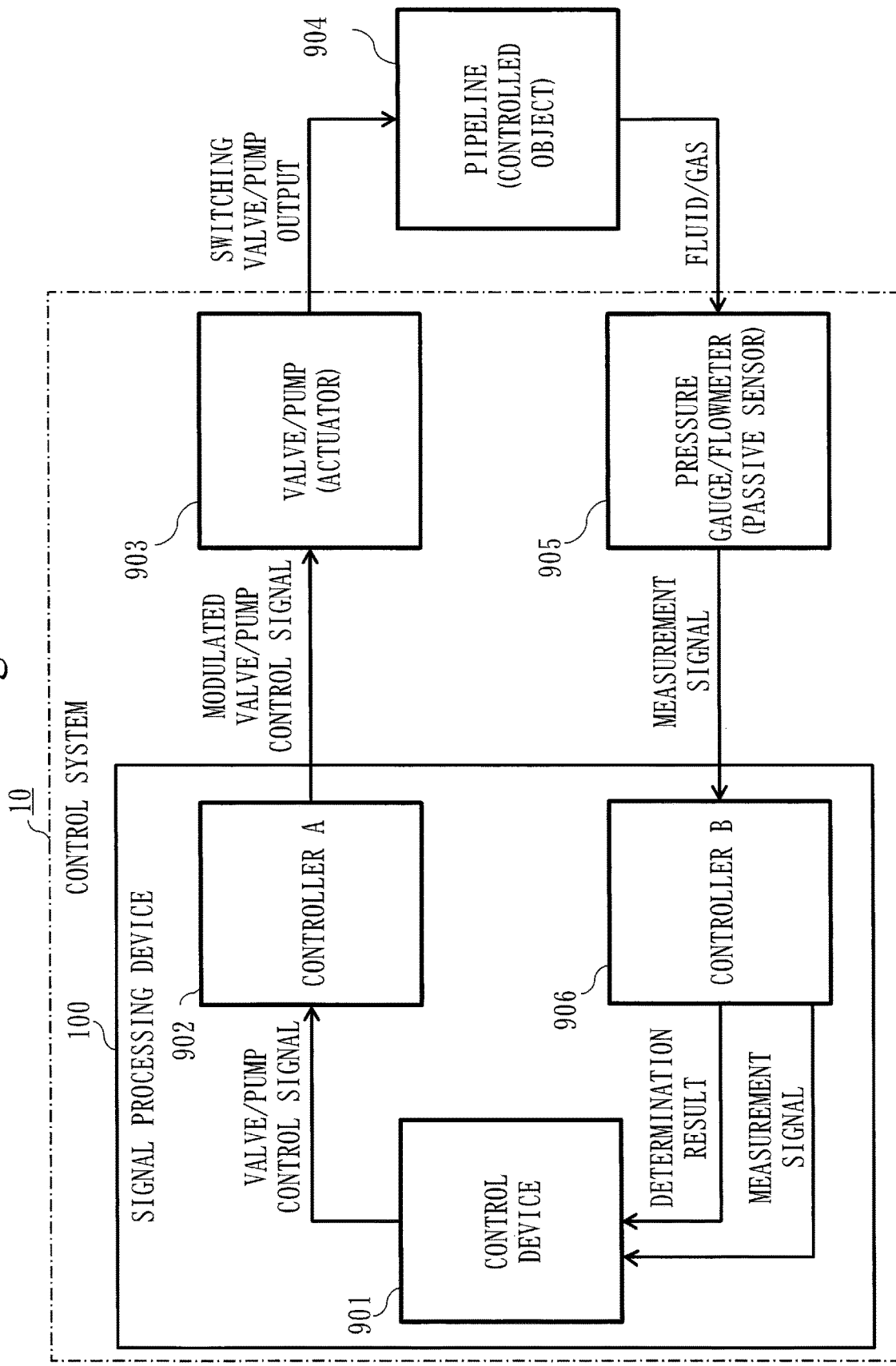
FIG. 10 is a diagram illustrating a configuration example of the control system when a controlled object is a pipeline according to the first embodiment.

FIG. 10 illustrates an example of the configuration of the control system 10 in a case wherein the control system 10 is applied to pipeline control. That is, FIG. 10 illustrates the example of the configuration supposed in a case wherein the configuration of FIG. 2 is applied to the pipeline control.

In the example of FIG. 10, a control device 901 corresponds to the control device 101, and a valve/pump 903 corresponds to the actuator 103. Further, the pipeline 901 corresponds to the controlled object 104, and a pressure gauge/flowmeter 905 corresponds to the passive sensor 105. Furthermore, a controller A902 corresponds to the controller A102, and a controller B906 corresponds to the controller B106. The controller A902 includes, similarly as the controller A102, the processor 201, the memory 202, the actuator control signal receiving interface 203, the actuator control signal transmitting interface 204 and the signal modulation unit 111. Further, the controller B906 includes, similarly as the controller B106, the processor 301, the memory 302, the measurement signal receiving interface 303, the measurement signal transmitting interface 304, the determination result transmitting interface 305, the correlation calculation unit 112 and the signal determination unit 113.

*Explanation of Operation*

The control device 901 transmits a valve/pump control signal to the controller A902 so as to make a value of the amount of fluid flowing close to a target value, based on the value read by the pressure gauge/flowmeter 905. The valve/pump control signal corresponds to an actuator control signal in the configuration of FIG. 2.

In the controller A902, the signal modulation unit 111 modulates the valve/pump control signal based on a modulation signal (sequence) shared with the controller B906, and transmits the valve/pump control signal after modulation to the valve/pump 903.

The valve/pump 903 operates based on the valve/pump control signal after modulation. As a result, the amount of fluid or gas flowing through the pipeline 904 fluctuates.

The pressure gauge/flowmeter 905 measures the amount of gas or fluid flowing through the pipeline 904, and transmits the measurement signal (sensing information) to the controller B906.

In the controller B906, the correlation calculation unit 112 calculates a correlation between the modulation signal (sequence) shared with the controller A902 and the measurement signal (sensor read value). Further, the signal determination unit 113 determines whether or not a change cancellation attack is made based on a correlation value. Then, the signal determination unit 113 transmits the measurement signal and the determination result to the control device 901.

Here, modulation in the signal modulation unit 111 will be described.

In pipeline control illustrated in FIG. 10, it is assumed that a direct-current control pump (direct current (DC) pump) is used, for example, as the valve/pump 903. The DC pump is controlled by a pulse width modulation (PWM) signal.

Reference Document 1 above describes PWM control.

FIG. 11 illustrates examples of an actuator control signal, a modulation signal and a modulated actuator control signal.

In the example of FIG. 11, as a modulation method, the sum of an actuator control signal and a modulation signal is adopted. That is, the signal modulation unit 111 generates a modulated actuator control signal by addition of the actuator control signal and the modulation signal.

The actuator control signal is a PWM signal.

In the example of FIG. 10, the signal modulation unit 111 performs modulation by taking the sum of the valve/pump control signal given by the control device 901 and the modulation signal.

It is assumed that an actuator control signal at the time point i is an actuator control signal $x_i$, a modulation signal at the time point i is a modulation signal $y_i$ and a modulated actuator control signal at the time point i is a modulated actuator control signal $z_i$. Further, a function f is assumed to be a modulation method of the signal modulation unit 111.

To calculate the modulated actuator control signal $z_i$, by the signal modulation unit 111 is expressed by a following formula 101:

$$z_i = f(x_i, y_i, z_{i-1})$$  Formula 101

As described above, the signal modulation unit 111 generates the modulated actuator control signal $z_i$ at the time point i by using the actuator control signal $x_i$, the modulation signal $y_i$ and the modulated actuator control signal $z_{i-1}$ generated at the previous time point (i−1).

For example, in the configuration of FIG. 10, the signal modulation unit 111 performs modulation as in the following formula 102.

In the formula 102, "+" denotes a logical sum, and "·" denotes a logical product. For example, it is obtained that 1+1=1, 1+0=1, 0+0=0, 1·1=1, 1·0=0, and 0·0=0.

$$z_i = x_i + y_i + 0 \cdot z_{i-1}$$  Formula 102

Next, a calculation method of a correlation by the correlation calculation unit 112 will be described.

The correlation calculation unit 112 may calculate a correlation by using, for example, the Pearson correlation coefficient disclosed in Reference Document 2. It is possible for the correlation calculation unit 112 to analyze strength of a relation between a measurement signal and a modulation signal by using the Pearson correlation coefficient.

Reference Document 2: Statistics Department, Faculty of Liberal Arts, University of Tokyo (1991) "A Guide to Statistics (Basic Statistics I)" Tokyo University Publications The above is one example of a case wherein the control system 10 according to the present embodiment is applied to a pipeline. However, the example of pipeline in FIG. 10 and the example of the modulation method in FIG. 11 are just examples. Therefore, it is possible to apply the control system 10 according to the present embodiment to another use, and to use another modulation method for the control system 10 according to the present embodiment.

Although it is not specified in the above a method to share a modulation signal between the controller A102 and the controller B106, it may be possible to have a modulation signal be shared in the following method, for example.

In a first method, the signal modulation unit 111 of the controller A102 generates a modulation signal, and stores the modulation signal generated in the memory 202. Then, the signal modulation unit 111 transmits the modulation signal to the controller B106 via a network, and the correlation calculation unit 112 stores the modulation signal in the memory 302.

In a second method, a high-order system to manage the control device 101, an external modulation signal generator or the control system 10 generates a modulation signal. Then, a generator of the modulation signal transmits the modulator signal to the controller A102 and the controller B106 via a network. In the controller A102, the signal modulation unit 111 stores the modulation signal in the memory 202, and in the controller B106, the correlation calculation unit 112 stores the modulation signal in the memory 302.

In a third method, the signal modulation unit 111 and the correlation calculation unit 112 respectively generate a same modulation signal by using a stream cipher by a pseudo random number generator based on a private key shared by the controller A102 and the controller B106. Then, the signal modulation unit 111 modulates an actuator control signal by using the modulation signal generated by using the stream cipher. Further, the correlation calculation unit 112 calculates a correlation between the modulation signal generated by using the stream cipher and a measurement signal.

As an example of the stream cipher, there is KCipher-2 as described in Reference Document 3.

Reference Document 3: IETF "RFC 7008" https://www.rfc-editor.org/info/rfc7008

Further, the signal modulation unit 111 corresponds to a plurality of modulation methods, and modulates the actuator control signal by a modulation method among the plurality of modulation methods.

For example, the signal modulation unit 111 modulates the actuator control signal by a modulation method among the plurality of modulation methods as follows. The modulation method of the signal modulation unit 111 is not limited to the followings.

1) Analog modulation such as AM modulation, FM modulation or another weak modulation method, etc.
2) Digital modulation such as amplitude shift keying (ASK), phase shift keying, etc.
3) A method to divide an actuator control signal into units of one byte, and to convert the least significant bit of each byte in accordance with a modulation signal (least significant bit (LSB) method in electronic watermark)

Further, the correlation calculation unit 112 and the signal determination unit 113 may change a calculation method of a correlation, a width of time window to segment a measurement signal used for calculation of the correlation with a modulation signal, or a threshold value, in accordance with a change in the environment where the actuator 103 exists, the environment where the passive sensor 105 exists or the environment where the controlled object 104 controlled by the actuator 103 exists.

For example, when a noise existing in the environment is increased, a ratio of signals to the noise is decreased, and a correlation value between a modulation signal and a measurement signal is lowered. Thus, in such a case, by increasing the width of time window, and calculating the correlation value between the modulation signal and the measurement signal in a long time range, it is possible to decrease the influence of noise, and to enhance a detection rate. Meanwhile, by simply reducing the threshold value, it is possible to decrease error detection even when a correlation value is decreased due to influence of the noise.

The change of the environment may be determined by the control device 101 in accordance with the measurement signal, etc. of the passive sensor 105, for example, and be transmitted to the controller B106. Specifically, in a case of an automobile, by information of the number of rotations of tires and the travel amount of the automobile, etc., a stop state or an operating state of tires is determined by the control device 101, and the information on it is transmitted to the controller B106. It is considered that at the time of the stop state, the threshold value is raised due to little noise, and at the time of the operating state, the threshold value is reduced due to much noise.

Further, the correlation calculation unit 112 corresponds to a plurality of correlation calculation methods, and calculates a correlation between a measurement signal and a modulation signal by a correlation calculation method among the plurality of correlation calculation methods.

For example, the correlation calculation unit 112 calculates a correlation by any calculation method among the calculation methods as follows. The correlation calculation method of the correlation calculation unit 112 is not limited to the followings.

1) To calculate a mutual correlation, a mutual information volume or likelihood between a modulation signal and a measurement signal
2) To calculate a square root (Euclidean distance) of a value taking the total sum of the square value of the difference between an element of the modulation signal (for example, an element of one byte) and an element of the measurement signal (for example, an element of one byte)
3) To calculate a geometrical distance (Mahalanobis distance, Manhattan distance, Chebyshev distance, Minkowski distance, etc.) conforming to a calculation method of 1) above, or a calculation method of 2) above
4) To calculate a mutual correlation, a mutual information volume, likelihood, or a geometrical distance between a measurement signal estimated based on a modulation signal and an actuator control signal, and an actual measurement signal Reference Document 4 as follows describes a mutual information volume.

Reference Document 2 describes likelihood.

Reference Document 5 as follows describes a geometrical distance.

Reference Document 4: Hideki Imai (1984), "Information Theory" Shokodou

Reference Document 5: Kotaro Oishi, "Sound Source Identification of Percussion Using Machine Learning" (2016)

Further, the correlation calculation unit 112 calculates a correlation using a modulation signal shared between the controller A102 and the controller B106, and a measurement signal, and it is necessary to extract a signal sequence with the same time length as the modulation signal from the measurement signal, for calculation of the correlation. In order to make the signal sequence extracted and the modulation signal be correlated, it is necessary for the correlation calculation unit 112 to start extraction from a point from which a change begins depending on the modulation signal in the measurement signal which is temporally continuous. That is, it is necessary that a time at which the modulation signal is embedded into an actuator control signal and a time at which the measurement signal is started to be extracted, are synchronized. Therefore, it is necessary to perform time synchronization between the controller A102 and the controller B106.

It may be applicable to perform time synchronization between the controller A102 and the controller B106 in advance before modulation by the signal modulation unit 111 and calculation of a correlation by the correlation calculation unit 112 are started.

Further, it may be applicable to decide a pattern sequence (pilot signal) for synchronization beforehand, and by transmitting and receiving the pattern sequence between the controller A102 and the controller B106, thereby time synchronization is performed between the controller A102 and the controller B106.

Then, in a state wherein the controller A102 and the controller B106 are time-synchronized, the signal modulation unit 111 modulates an actuator control signal using a modulation signal, the correlation calculation unit 112 calculates a correlation between a measurement signal and the modulation signal, and the signal determination unit 113 determines whether or not the measurement signal is a legitimate signal using the correlation value.

Further, it may be applicable, for example, that the correlation calculation unit 112 extracts a signal sequence sequentially from a measurement signal while shifting an arbitrary time window, and calculates, for each signal sequence extracted, a correlation between a signal sequence in the modulation signal in the corresponding time window with each signal sequence extracted.

Figure 12:
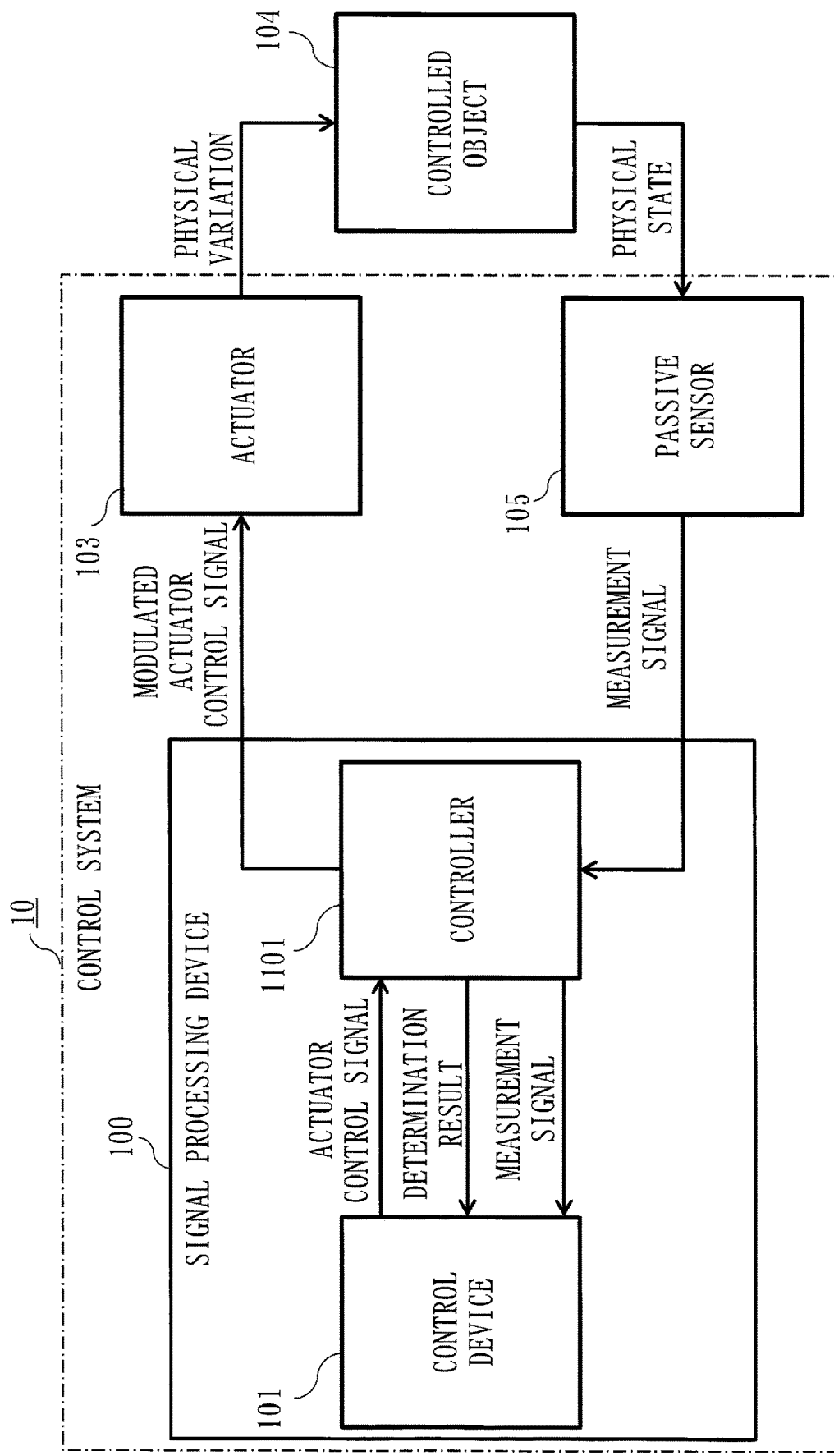
FIG. 12 is a diagram illustrating another configuration example of the control system according to the first embodiment.

Furthermore, it may be applicable to have the configuration of the control system 10 be a configuration illustrated in FIG. 12 instead of the configuration illustrated in FIG. 2. In FIG. 12, the controller A102 and the controller B106 are configured as one controller 1101.

In the configuration of FIG. 12, the controller 1101 includes the signal modulation unit 111, the correlation calculation unit 112 and the signal determination unit 113, which are not illustrated.

The controller 1101 includes a processor and a memory which are not illustrated, similarly as the controller A102 or the controller B106. The signal modulation unit 111, the correlation calculation unit 112 and the signal determination unit 113 are performed by the processor. Further, the controller 1101 includes interface circuits corresponding to the actuator control signal receiving interface 203, the actuator control signal transmitting interface 204, the measurement signal receiving interface 303, the measurement signal transmitting interface 304 and the determination result transmitting interface 305, which are not illustrated.

In the configuration of FIG. 12, sharing of a modulation signal which is necessary in the configuration of FIG. 2 is unnecessary.

In the configuration of FIG. 12, it is possible to generate a modulation signal by the second method and the third method described above, for example.

Figure 13:
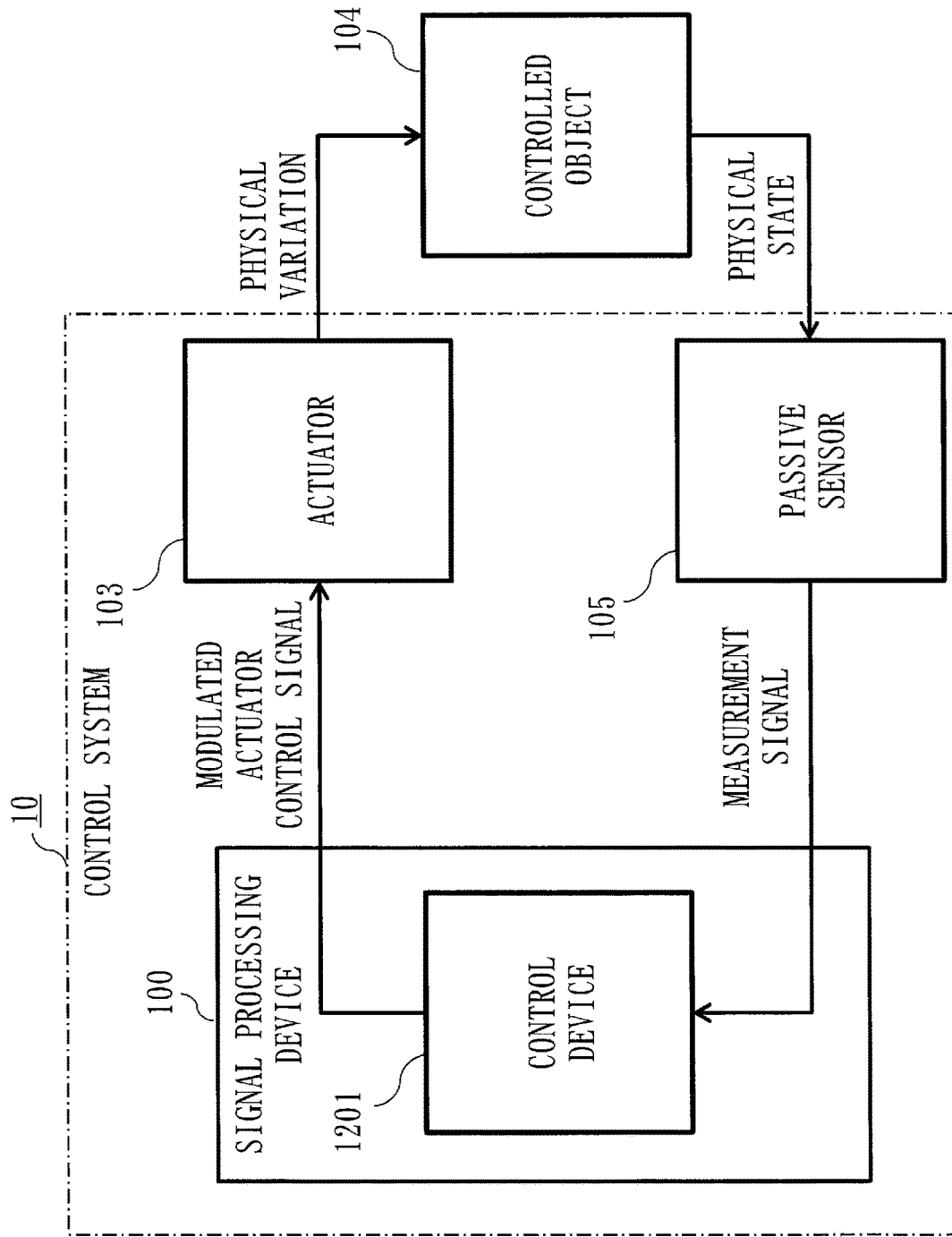
FIG. 13 is a diagram illustrating another configuration example of the control system according to the first embodiment.

Further, it may be applicable to have the configuration of the control system 10 be a configuration illustrated in FIG. 13 instead of the configuration illustrated in FIG. 2. In FIG. 13, the control device 101, the controller A102 and the controller B106 are configured as one control device 1201.

In the configuration of FIG. 13, the control device 1201 includes the signal modulation unit 111, the correlation calculation unit 112 and the signal determination unit 113, which are not illustrated. Further, in the configuration of FIG. 13, the control device 1201 performs generation of an actuator control signal and feedback control in accordance with a measurement signal.

Furthermore, the control device 1201 includes a processor and a memory which are not illustrated, similarly as the controller A102 or the controller B106. The signal modulation unit 111, the correlation calculation unit 112 and the signal determination unit 113 are performed by the processor. Further, the control device 1201 includes interface circuits corresponding to the actuator control signal transmitting interface 204 and the measurement signal receiving interface 303.

In the configuration of FIG. 13, sharing of a modulation signal which is necessary in the configuration of FIG. 2 is unnecessary.

In the configuration of FIG. 13, it is possible to generate a modulation signal by the second method and the third method above, for example.

Figure 14:
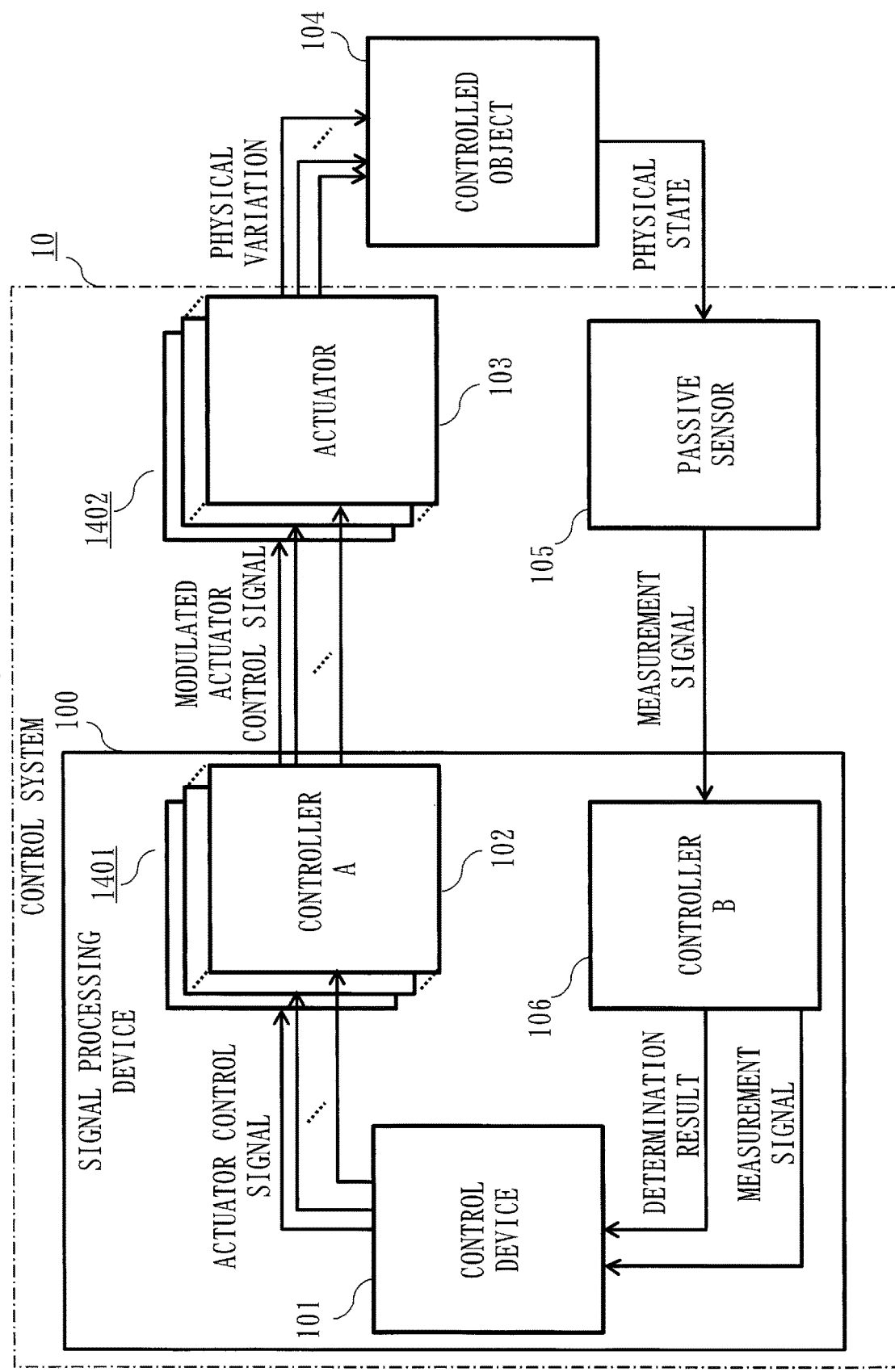
FIG. 14 is a diagram illustrating another configuration example of the control system according to the first embodiment.

Further, it may be applicable to have the configuration of the control system 10 be a configuration illustrated in FIG. 14 instead of the configuration illustrated in FIG. 2.

In FIG. 14, the controller A102 and the actuator 103 are respectively configured as a controller A group 1401 and an actuator group 1402. In the configuration of FIG. 14, a controller A of the controller A group 1401 and an actuator of the actuator group 1402 are paired one to one. The controller A group 1401 is configured by the controller A102 illustrated in FIG. 2. Further, the actuator group 1402 is configured by the actuators 103 illustrated in FIG. 2. That is, in the configuration of FIG. 14, a plurality of sets of the controller A102 and the actuator 103 exist.

Further, each controller A102 includes the signal modulation unit 111, which is not illustrated in FIG. 14. Each of the plurality of signal modulation units 111 is associated with any actuator 103 included in the actuator group 1402, and each signal modulation unit 111 transmits a modulated actuator control signal to the actuator 103 associated with.

Furthermore, each controller A102 of the controller A group 1401 and the controller B106 share a modulation signal. The controller B106 includes the correlation calculation unit 112 and the signal determination unit 113 illustrated in FIG. 2.

First, the control device 101 transmits an actuator control signal to each controller A102 of the controller A group 1401. In each controller A102 of the controller A group 1401, the signal modulation unit 111 modulates the actuator control signal by each using different modulation signals, and generates a modulated actuator control signal. Then, each controller A102 of the controller A group 1401 transmits the modulated actuator control signal respectively to the corresponding actuator 103 in the actuator group 1402.

Each actuator 103 of the actuator group 1402 adds a physical variation to the controlled object 104, and a physical state of the controlled object 104 changes.

The passive sensor 105 measures the physical state of the controlled object 104, and transmits the measurement signal to the controller B106.

In the controller B106, the correlation calculation unit 112 calculates a correlation value between the measurement signal received from the passive sensor 105 and a modulation signal (modulation signal used for modulation of the actuator control signal by each signal modulation unit 111) shared with each controller A102 of the controller A group 1401. As a result, the correlation calculation unit 112 obtains as many correlation values as the controllers A102 of the controller group 1401.

The signal determination unit 113 determines whether or not the measurement signal is a legitimate signal by using the plurality of correlation values obtained by the correlation calculation unit 112. That is, the signal determination unit 113 detects whether or not an attack is made by comparing each of the plurality of correlation values with a threshold value. Specifically, the signal determination unit 113 determines that an attack is made when there is at least one correlation value that is lower than the threshold value. Accordingly, it is possible to detect an attack even when an attacker inputs an illegitimate signal to a certain actuator 103 of the actuator group 1402. As a result, it is possible to improve a detection rate of an attack and to suppress an error detection rate.

Figure 15:
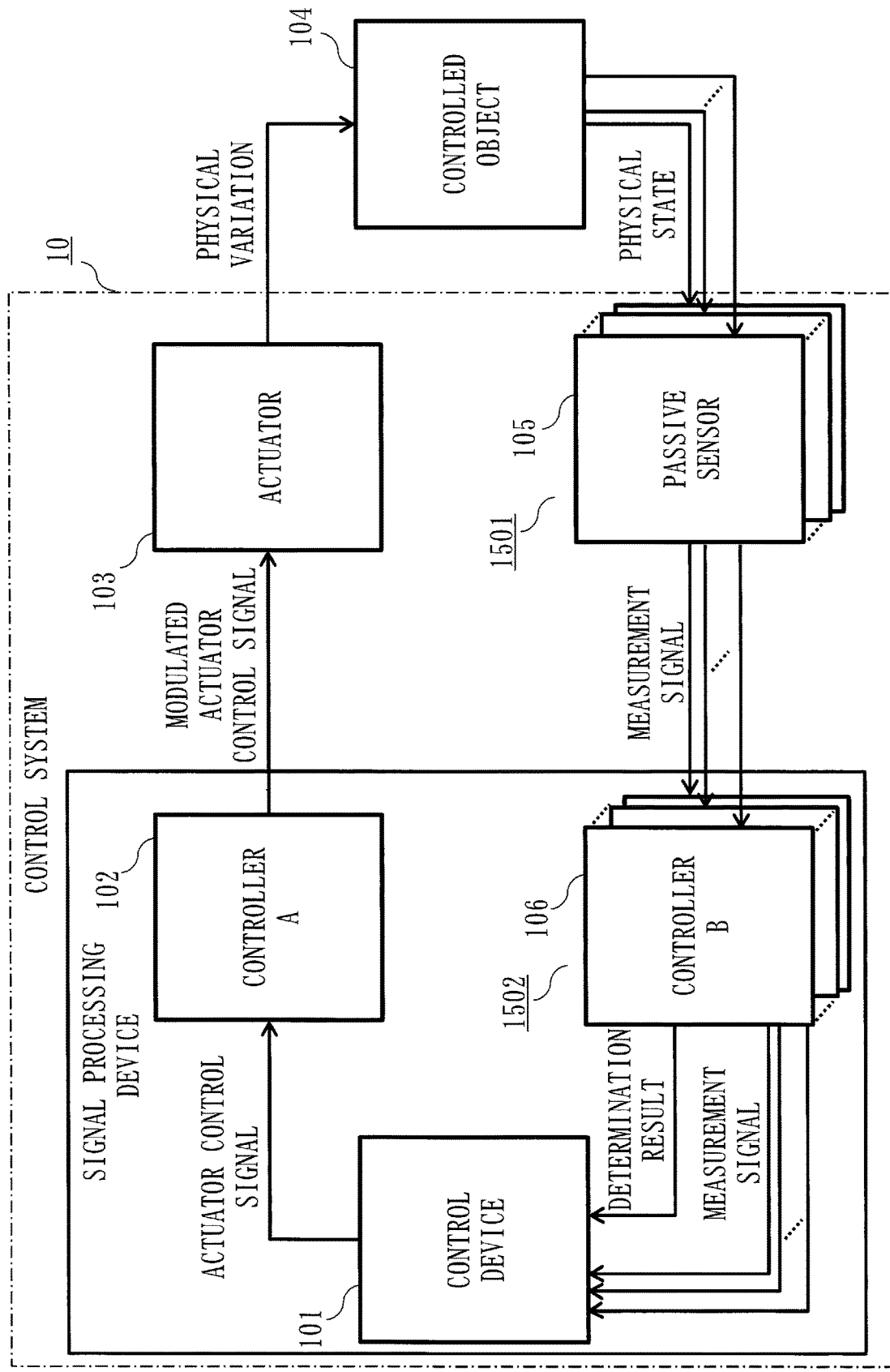
FIG. 15 is a flowchart illustrating another configuration example of the control system according to the first embodiment.

Further, it may be applicable to have the configuration of the control system 10 be a configuration illustrated in FIG. 15 instead of the configuration of FIG. 2. In FIG. 15, the passive sensors 105 and the controllers B106 are respectively configured as a passive sensor group 1501 and a controller B group 1502. In the configuration of FIG. 15, a passive sensor of the passive sensor group 1501 and a controller B of the controller B group 1502 are paired one to one.

The controller B group 1502 is configured by the controllers B106 as illustrated in FIG. 2. Further, the passive sensor group 1501 is configured by the passive sensors 105 as illustrated in FIG. 2. That is, in the configuration of FIG. 15, a plurality of sets of the controller B106 and the passive sensor 105 exist.

Further, each controller B106 of the controller B group 1502 and the controller A102 share a modulation signal.

Although it is not illustrated in FIG. 15, the controller A102 includes the signal modulation unit 111.

Furthermore, each controller B106 includes the correlation calculation unit 112. The plurality of correlation calculation units 112 are associated with any passive sensor 105 included in the passive sensor group 1501. Each correlation calculation unit 112 calculates a correlation between a measurement signal from the passive sensor 105 associated with, and a modulation signal used for modulation of an actuator control signal by the signal modulation unit 111.

Further, one controller B106 of the plurality of controllers B106 includes the signal determination unit 113. The controller B106 including the signal determination unit 113 is hereinafter called a representative controller B106. The signal determination unit 113 in the representative controller B106 determines whether or not each of the plurality of measurement signals is a legitimate signal by using the plurality of correlation values obtained by the plurality of correlation calculation units 112.

The operation until the actuator 103 adds a physical variation to the controlled object 104 is the same also in the configuration of FIG. 15 as in the configuration of FIG. 2.

In the configuration of FIG. 15, a processing method of the measurement signal from each passive sensor 105 is different.

Each of a physical state of the controlled object 104 sensed by each passive sensor 105 in the passive sensor group 1501 is transmitted, as a measurement signal, to the corresponding controller B in the controller B group 1502.

In each controller B106 of the controller B group 1502, the correlation calculation unit 112 calculates a correlation value between each modulation signal and the measurement signal. Then, each correlation calculation unit 112 transmits the correlation value and the measurement signal to the representative controller B106.

In the representative controller B106, the signal determination unit 113 determines whether or not each of the plurality of measurement signals is a legitimate signal by using the plurality of correlation values obtained by the plurality of correlation calculation units 112. That is, the signal determination unit 113 detects whether or not an attack is made by comparing each of the plurality of correlation values with a threshold value. Specifically, the signal determination unit 113 determines that an attack is made when at least one correlation value is lower than the threshold value. Accordingly, it is possible to improve a detection rate of an attack and suppress an error detection rate.

Although it is here described an example wherein the representative controller B106 includes the signal determination unit 113, the control device 101, not the representative controller B106, may include the signal determination unit 113. When the control device 101 includes the signal determination unit 113, the correlation calculation unit 112 of each controller B106 transmits the correlation value calculated to the control device 101. Then, the signal determination unit 113 in the control device 101 determines whether or not each of the plurality of measurement signals is a legitimate signal by using the plurality of correlation values received. The operation of the signal determination unit 113 is as described above.

*Explanation of Effect of Embodiment*

In the present embodiment, when an actuator operates based on a modulated actuator control signal, since components of a modulation signal is included in a measurement signal, a correlation between the measurement signal and the modulation signal is high. Therefore, according to the present embodiment, it is possible to determine whether or not the measurement signal from the passive sensor is a legitimate signal by using a correlation value between the measurement signal and the modulation signal.

Therefore, according to the present embodiment, even when a passive sensor not including a dedicated actuator is used, it is possible to detect a change cancellation attack by adding the modulation signal to an actuator control signal.

*Explanation of Hardware Configuration*

Lastly, a supplementary explanation of the hardware configuration of the controller A102 and the controller B106 will be provided. The following explanation is also applied to the controller 1101 of FIG. 12 and the control device 1201 of FIG. 13.

The processor 201 and the processor 301 are central processing units (CPUs), digital signal processors (DSPs), etc.

The memory 202 and the memory 302 are random access memories (RAMs), read only memories (ROMs), flash memories, or hard disk drives (HDDs), solid state drives (SSDs), etc.

The actuator control signal receiving interface 203 is an inter-integrated circuit (I2C) interface, a serial peripheral interface (SPI), an Ethernet (registered trademark) interface, etc. The actuator control signal transmitting interface 204 is a digital-to-analog converter (DAC).

The measurement signal receiving interface 303 is an analog-to-digital converter (ADC). The measurement signal transmitting interface 304 and the determination result transmitting interface 305 are I2C interfaces, SPI interfaces, Ethernet (registered trademark) interfaces, etc.

Furthermore, the "units" of the signal modulation unit 111, the correlation calculation unit 112 and the signal determination unit 113 may be replaced with "circuits," "steps," "procedures" or "processes."

Further, the controller A102 and the controller B106 may be realized by electronic circuits such as logic integrated circuits (logic ICs), gate arrays (GAs), application specific integrated circuits (ASICs) or field-programmable gate arrays (FPGAs), etc.

The processors and the electronic circuits as described above are collectively referred to as "processing circuitry" as well.

REFERENCE SIGNS LIST

10: control system; 100: signal processing device; 101: control device; 102: controller A; 103: actuator; 104: controlled object; 105: passive sensor; 106: controller B; 111: signal modulation unit; 112: correlation calculation unit; 113: signal determination unit; 201: processor; 202: memory; 203: actuator control signal receiving interface; 204: actuator control signal transmitting interface; 301: processor; 302: memory; 303: measurement signal receiving interface; 304: measurement signal transmitting interface; 305: determination result transmitting interface; 401: attacker; 901: control device; 902: controller A; 903: valve/pump; 904: pipeline; 905: pressure gauge/flowmeter; 906: controller B; 1101: controller; 1201: control device.

The invention claimed is:

1. A signal processing device that is connected to an actuator, and a passive sensor to measure a physical state when the actuator operates, the signal processing device comprising:

at least one processor; and
a memory storing instructions which, when executed, causes the at least one processor to perform a process comprising:
modulating an actuator control signal for controlling the actuator by using a modulation signal;
calculating, when a measurement signal indicating the physical state measured by the passive sensor is received from the passive sensor after the modulated actuator control signal being the actuator control signal is transmitted to the actuator, a correlation between the measurement signal received and the modulation signal used for modulation of the actuator control signal; and
comparing a correlation value, which is obtained by calculating the correlation, with a threshold value, and determine whether the measurement signal is a legitimate signal or an illegitimate signal caused by an attack to an environment where the passive sensor exists,
wherein the actuator control signal is designed to control the actuator to effect a desired change in a physical state of a controlled object,
the modulation is a predefined modulation signal, and
the modulation of the actuator control signal using the predefined modulation signal causes the actuator to effect a redundant change in the physical state of the controlled object relative to the desired change in the physical state effected according to the unmodulated actuator control signal.

2. The signal processing device as defined in claim 1, wherein the process further comprises outputting a warning when the measurement signal is determined to be the illegitimate signal.

3. The signal processing device as defined in claim 1, wherein a same modulation signal, which is used for modulating the actuator control signal and calculating the correlation, is generated by using a pseudo random number generator.

4. The signal processing device as defined in claim 3, wherein the same modulation signal is generated by using a stream cipher by the pseudo random number generator.

5. The signal processing device as defined in claim 1, wherein the process selects a modulation method from among a plurality of modulation methods, and uses the selected modulation method to modulate the actuator control signal.

6. The signal processing device as defined in claim 1, wherein the process selects a correlation calculation method from among a plurality of correlation calculation methods, and calculates the correlation between the measurement signal and the modulation signal by the selected correlation calculation method.

7. The signal processing device as defined in claim 6, wherein the process changes a calculation method of the correlation in accordance with a change in an environment where the actuator exists, an environment where the passive sensor exists or an environment where a controlled object controlled by the actuator exists.

8. The signal processing device as defined in claim 1, the signal processing device further comprising a first controller to control the actuator, and a second controller to control the passive sensor,
wherein the first controller modulates the actuator control signal using the modulation signal, and
wherein the second controller calculates the correlation and determines whether the measurement signal is a legitimate signal or an illegitimate signal.

9. The signal processing device as defined in claim 8, wherein in a state wherein the first controller and the second controller are time-synchronized, the actuator control signal is modulated using the modulation signal, the correlation between the measurement signal and the modulation signal is calculated, and the determination is made whether the measurement signal is a legitimate signal or an illegitimate signal by using the correlation value.

10. The signal processing device as defined in claim 9, wherein the process sequentially extracts a signal sequence from the measurement signal while shifting an arbitrary time window, and calculates, for each signal sequence extracted, a correlation between a signal sequence in the modulation signal in the corresponding time window and the each signal sequence extracted.

11. The signal processing device as defined in claim 10, wherein the process changes a width of the time window in accordance with change in an environment where the actuator exists, an environment where the passive sensor exists, or an environment where a controlled object controlled by the actuator exists.

12. The signal processing device as defined in claim 1, wherein the process changes the threshold value in accordance with change in an environment where the actuator exists, an environment where the passive sensor exists, or an environment where a controlled object controlled by the actuator exists.

13. The signal processing device as defined in claim 1, the signal processing device being connected to a plurality of actuators,
wherein the process modulates, for each of the plurality of actuators, a corresponding actuator control signal by using a corresponding modulation signal,
wherein the process calculates, when the measurement signal is received from the passive sensor after a plurality of modulated actuator control signals having been modulated by the process are transmitted to corresponding ones of the plurality of actuators, correlations between the measurement signal received and the corresponding modulation signals used for modulation of the actuator control signals, and
wherein the process determines whether or not the measurement signal is a legitimate signal by using a plurality of correlation values obtained by calculating the correlations.

14. The signal processing device as defined in claim 1, the signal processing device being connected to a plurality of passive sensors to measure a physical state when the actuator operates,
wherein the process calculates, when a measurement signal indicating a physical state measured by a corresponding one of the plurality of passive sensors is received from the corresponding passive sensor, a correlation between the measurement signal received and the modulation signal, and
wherein the process determines whether or not each of a plurality of measurement signals measured respectively by the plurality of passive sensors is a legitimate signal by using a plurality of correlation values obtained by calculating the correlation between the measurement signals received by the plurality of passive sensors and the modulation signal.

15. A signal processing method by a computer connected to an actuator, and a passive sensor to measure a physical state when the actuator operates, the signal processing method comprising:
- modulating an actuator control signal for controlling the actuator by using a modulation signal;
- calculating, when a measurement signal indicating the physical state measured by the passive sensor is received from the passive sensor after a modulated actuator control signal being the actuator control signal having been modulated is transmitted to the actuator, a correlation between the measurement signal received and the modulation signal used for modulation of the actuator control signal; and
- comparing a correlation value obtained by calculation of the correlation between the measurement signal and the modulation signal with a threshold value, and determining whether the measurement signal is a legitimate signal or an illegitimate signal caused by an attack to an environment where the passive sensor exists,
- wherein the actuator control signal is designed to control the actuator to effect a desired change in a physical state of a controlled object,
- the modulation is a predefined modulation signal, and
- the modulation of the actuator control signal using the predefined modulation signal causes the actuator to effect a redundant change in the physical state of the controlled object relative to the desired change in the physical state effected according to the unmodulated actuator control signal.

16. A non-transitory computer readable medium storing a signal processing program which causes, a computer connected to an actuator, and a passive sensor to measure a physical state when the actuator operates, to execute:
- a signal modulation process that modulates an actuator control signal for controlling the actuator by using a modulation signal;
- a correlation calculation process that calculates, when a measurement signal indicating the physical state measured by the passive sensor is received from the passive sensor after a modulated actuator control signal being the actuator control signal having been modulated in the signal modulation process is transmitted to the actuator, a correlation between the measurement signal received and the modulation signal used for modulation of the actuator control signal in the signal modulation process; and
- a signal determination process that compares a correlation value obtained by the correlation calculation process with a threshold value, and determines whether the measurement signal is a legitimate signal or an illegitimate signal caused by an attack to an environment where the passive sensor exists,
- wherein the actuator control signal is designed to control the actuator to effect a desired change in a physical state of a controlled object,
- the modulation is a predefined modulation signal, and
- the modulation of the actuator control signal using the predefined modulation signal causes the actuator to effect a redundant change in the physical state of the controlled object relative to the desired change in the physical state effected according to the unmodulated actuator control signal.

* * * * *